(12) United States Patent
Lenk et al.

(10) Patent No.: US 9,847,633 B2
(45) Date of Patent: Dec. 19, 2017

(54) INSULATING COVER FOR TRANSFORMER BRACKETS

(71) Applicant: Hubbell Incorporated, Shelton, CT (US)

(72) Inventors: Dennis Wilbur Lenk, Medina, OH (US); Michael Geoffrey Comber, Copley, OH (US); Saroni Brahma, Wadsworth, OH (US)

(73) Assignee: Hubbell Incorporated, Shelton, CT (US)

( * ) Notice: Subject to any disclaimer, the term of this patent is extended or adjusted under 35 U.S.C. 154(b) by 325 days.

(21) Appl. No.: 14/534,822

(22) Filed: Nov. 6, 2014

(65) Prior Publication Data

US 2016/0133360 A1    May 12, 2016

(51) Int. Cl.
| | | |
|---|---|---|
| *H01C 1/022* | (2006.01) | |
| *H02H 7/04* | (2006.01) | |
| *H01F 27/02* | (2006.01) | |

(52) U.S. Cl.
CPC .............. *H02H 7/04* (2013.01); *H01F 27/02* (2013.01)

(58) Field of Classification Search
USPC ................... 361/40, 117, 118, 127, 131, 132
See application file for complete search history.

(56) References Cited

U.S. PATENT DOCUMENTS

| | | | | |
|---|---|---|---|---|
| 2,756,367 | A * | 7/1956 | Baker | H01T 1/14 |
| | | | | 337/31 |
| 3,462,760 | A | 8/1969 | Wetzel | |
| 3,798,505 | A * | 3/1974 | Reckard | H01T 1/16 |
| | | | | 313/246 |
| 7,009,102 | B2 | 3/2006 | Milner | |
| D670,253 | S | 11/2012 | Strong et al. | |
| 8,633,391 | B2 | 1/2014 | Strong et al. | |
| 9,006,332 | B2 * | 4/2015 | Kerstetter, III | C08L 23/10 |
| | | | | 523/200 |
| 2005/0073779 | A1 | 4/2005 | Milner | |
| 2009/0294170 | A1 | 12/2009 | Spencer | |
| 2010/0101823 | A1 | 4/2010 | Eaton | |
| 2012/0320552 | A1* | 12/2012 | Strong | F16B 37/14 |
| | | | | 361/807 |
| 2016/0133360 | A1* | 5/2016 | Lenk | H01F 27/02 |
| | | | | 361/40 |

FOREIGN PATENT DOCUMENTS

WO    2010091232 A2    8/2010

OTHER PUBLICATIONS

PCT International Search Report and Written Opinion dated Jan. 14, 2016 from corresponding Application No. PCT/US15/56838, 14 pages.

(Continued)

*Primary Examiner* — Ronald W Leja
(74) *Attorney, Agent, or Firm* — Dillworth IP LLC

(57) ABSTRACT

The present disclosure provides insulating covers for mounting brackets used to secure arrester assemblies to transformers. The purpose of the insulating cover is to protect wildlife from electric shock, and to prevent power interruptions on high voltage distribution lines caused by the bridging of high voltage circuits by wildlife.

45 Claims, 24 Drawing Sheets

(56) References Cited

OTHER PUBLICATIONS

AB Cap Brochure "Arrester Bracket Wildlife Guard, Product Data Sheet", Central Moloney, Inc., Components Operation, Apr. 15, 2006.
AB Cap Brochure "Arrester Bracket Wildlife Guard" Central Moloney, Inc., Components Operation, Jul. 1, 2014.
ZForce Brochure "Zforce (TM) Distribution Arrester EZ Ordering Information", MacLean Power Systems, May 2010.
Eaton's Cooper Power Systems Brochure, "Superior protection for arresters and wildlife", Jun. 2014.

* cited by examiner

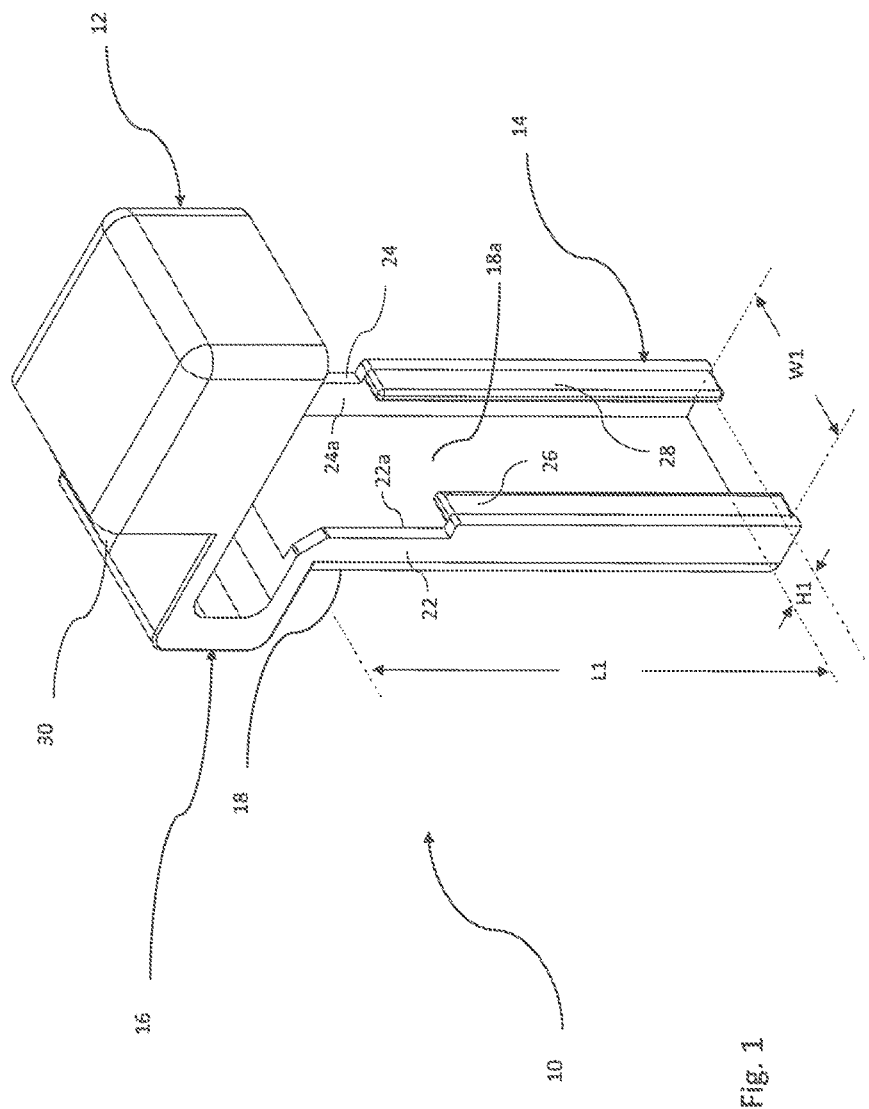

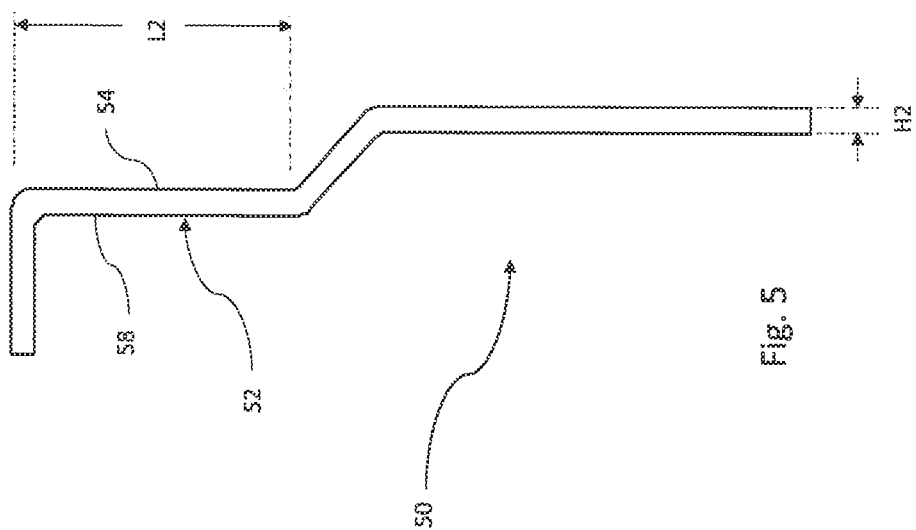
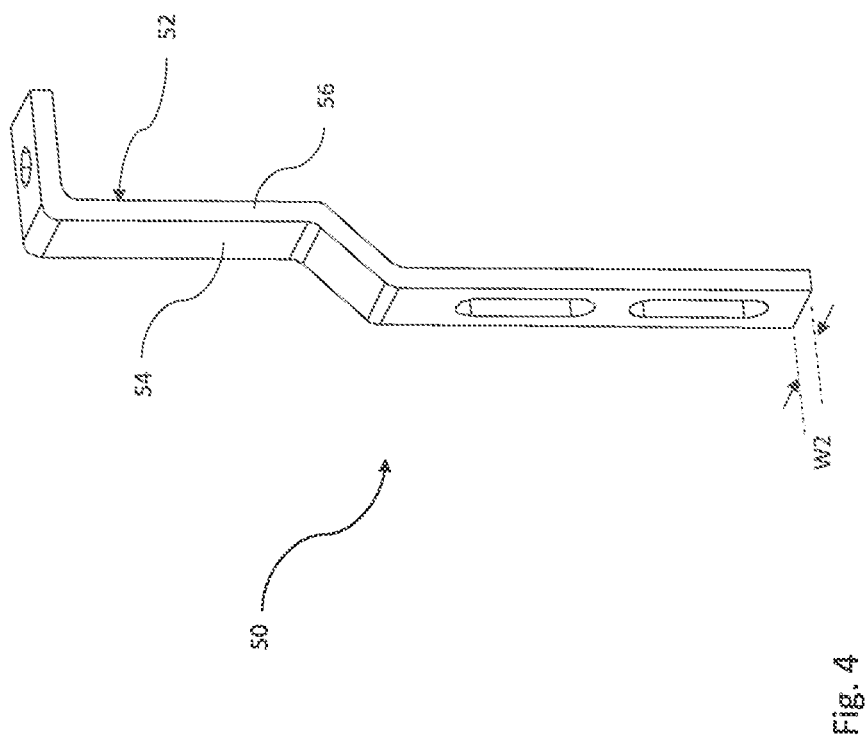

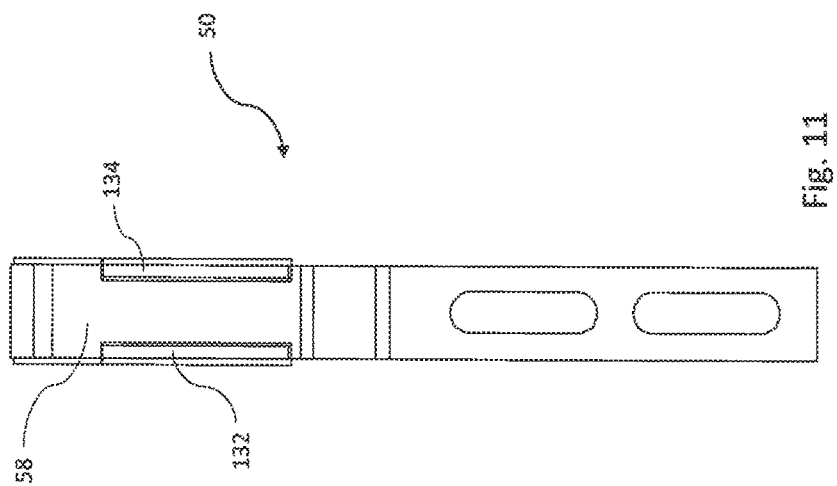
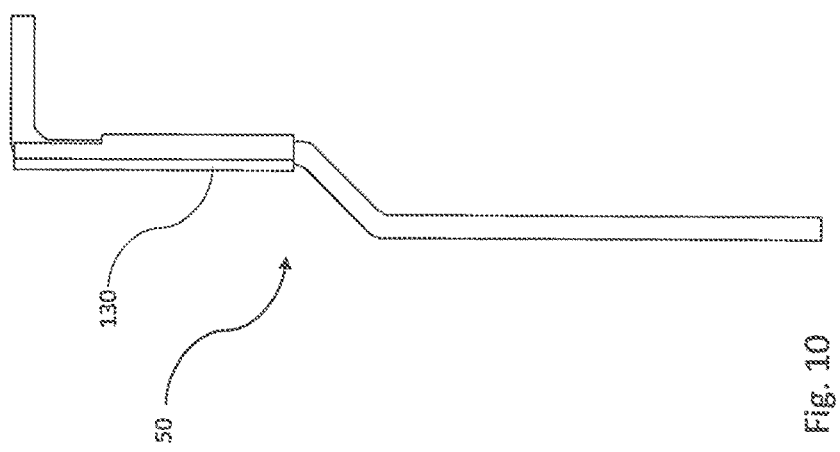
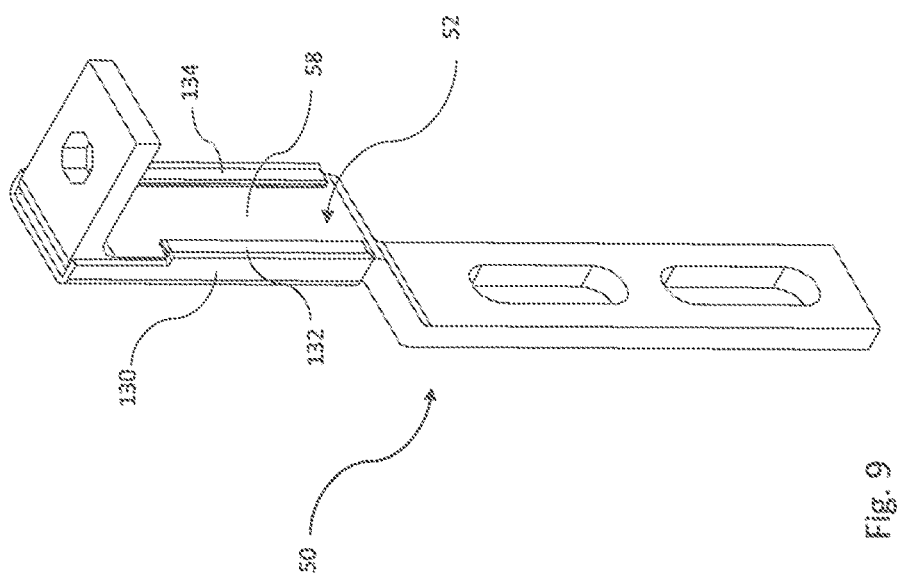

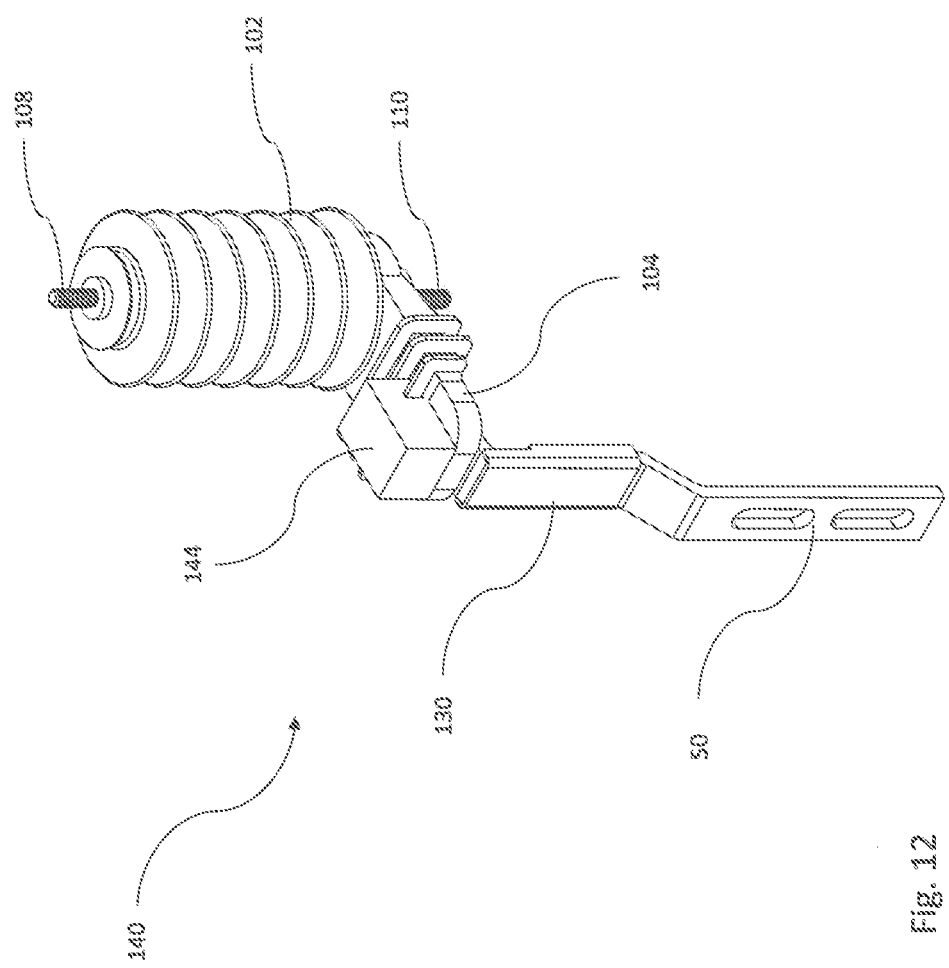

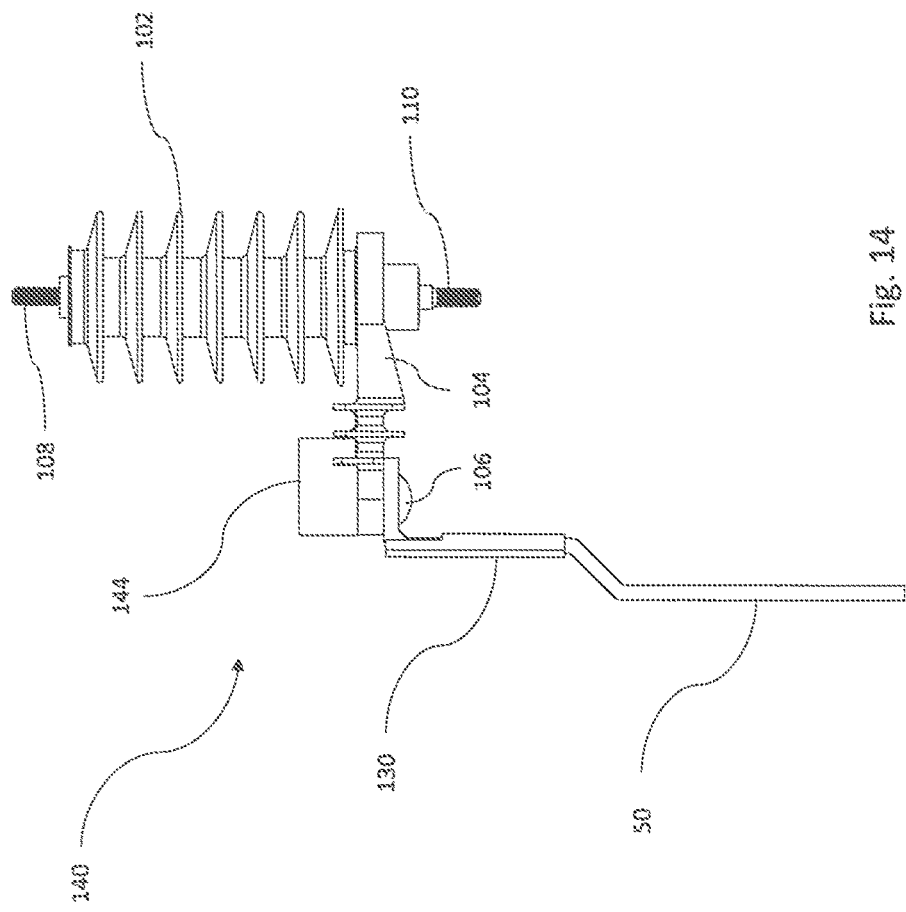
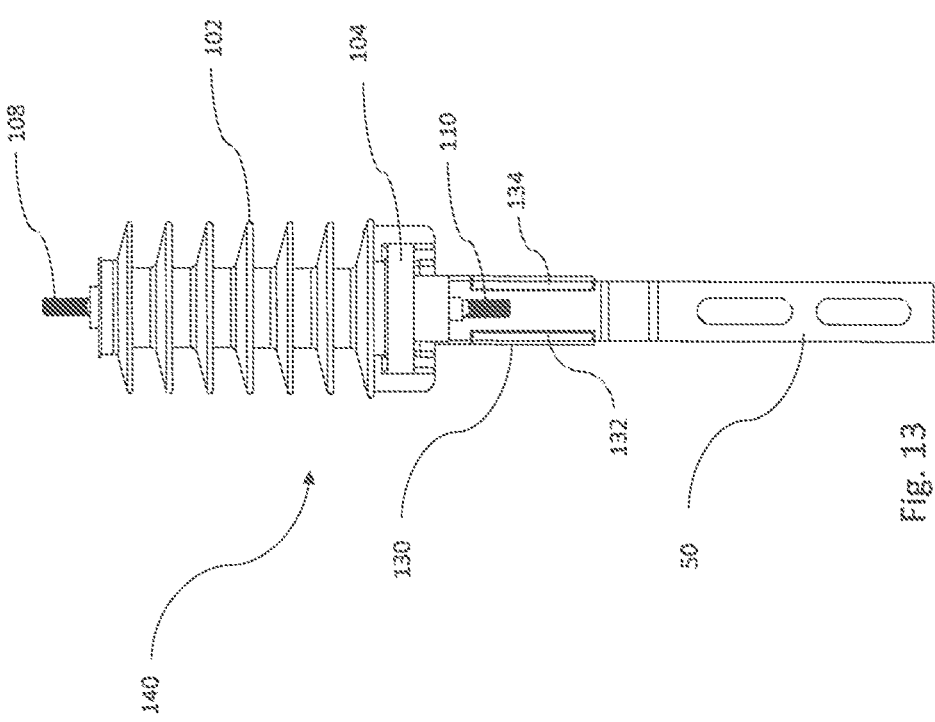

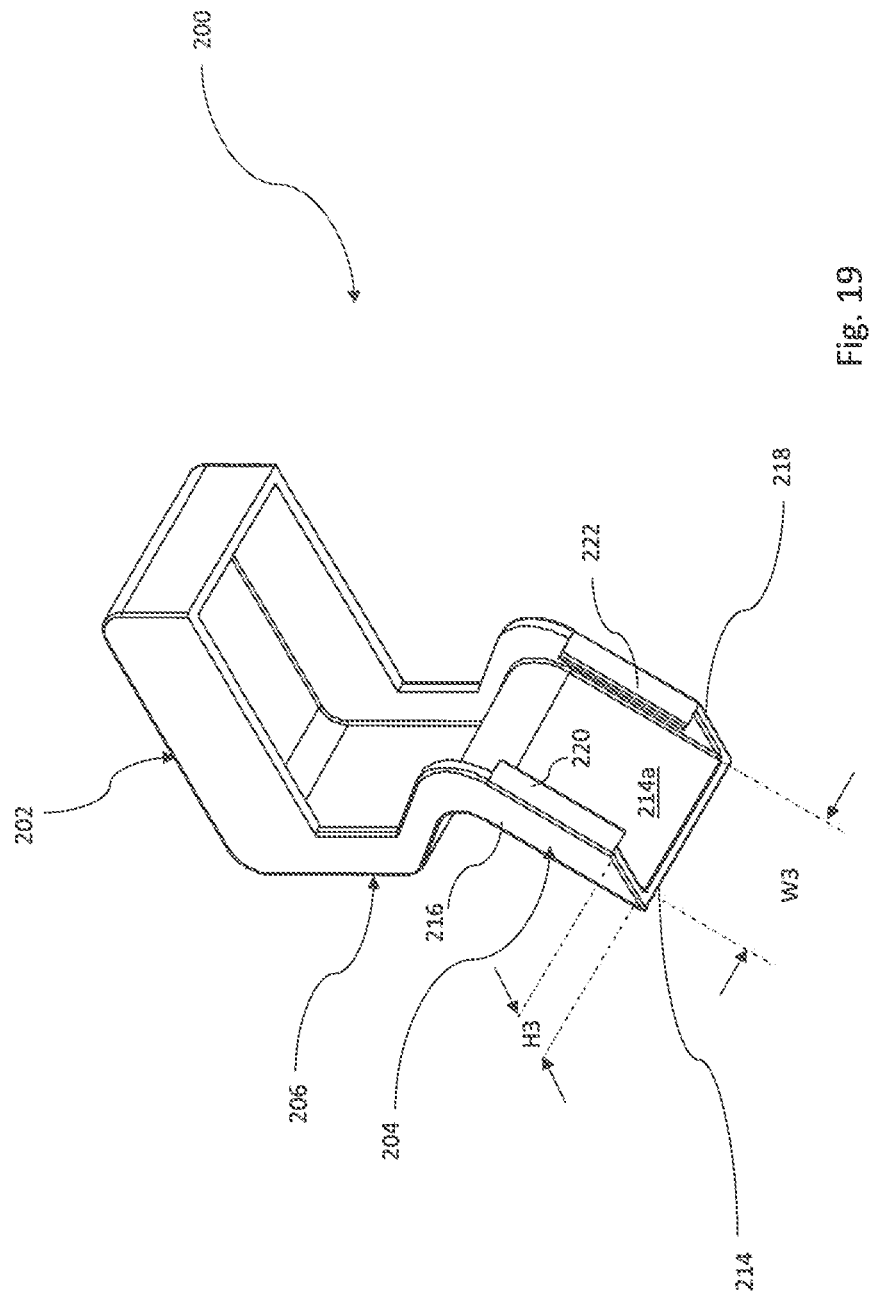

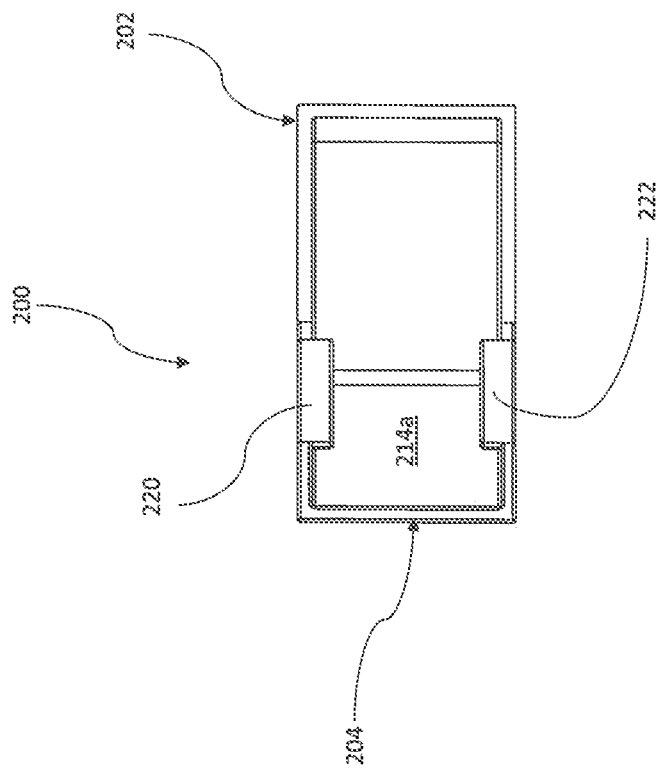
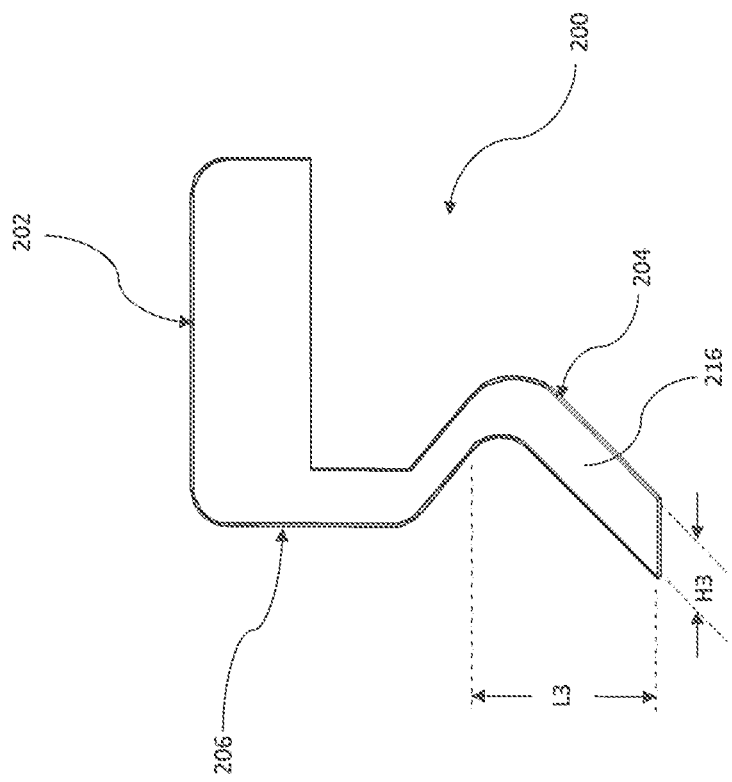

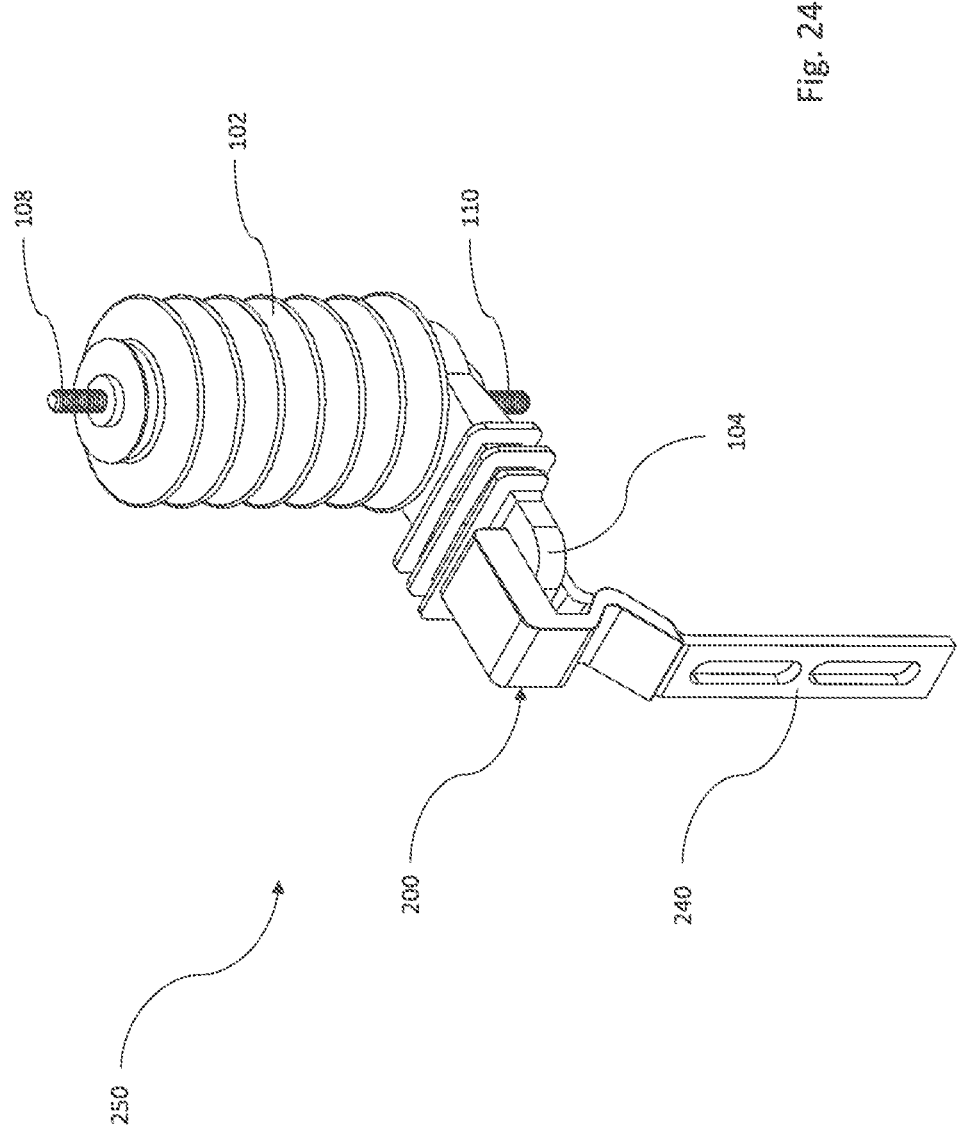

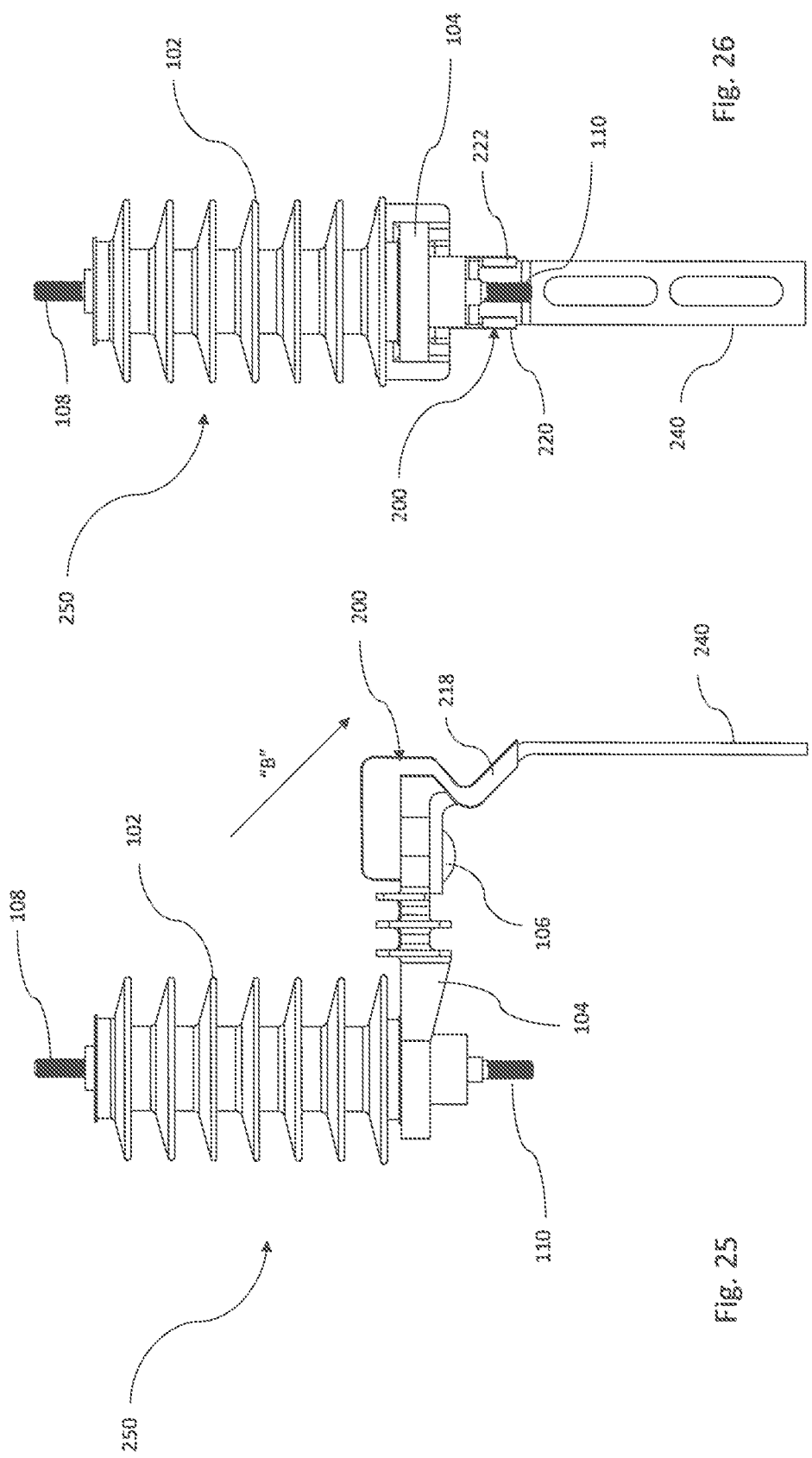

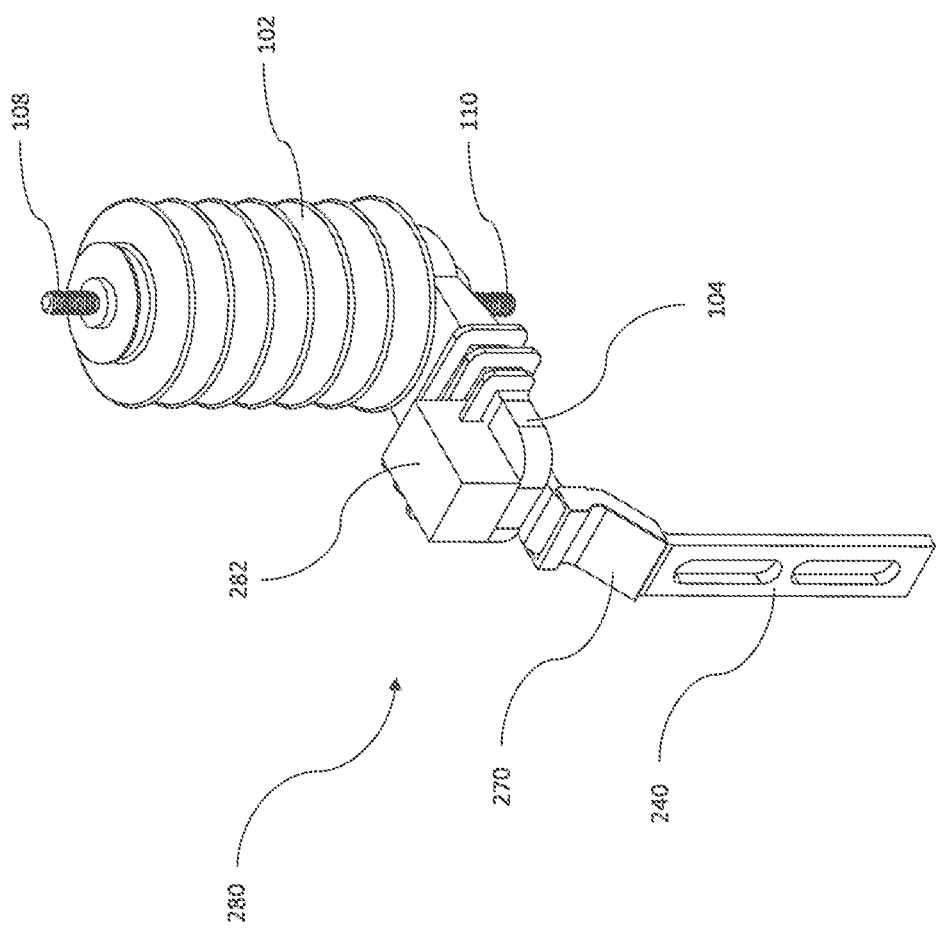

INSULATING COVER FOR TRANSFORMER BRACKETS

BACKGROUND

Field

The present disclosure relates generally to insulating covers for use in high voltage distribution systems, and more particularly to insulating covers for arrestor assemblies mounted to transformers.

Description of the Related Art

High voltage power distribution systems use transformers to step down the voltage on the power lines for customer usage. To protect such transformers against electrical surges caused by lightning or switching events, lightning or surge arresters are used. Surge arresters are often sold as assemblies to transformer manufacturers who then mount the arrester assembly to the transformer tank, and package the transformer and arrester assembly for shipment to a customer, e.g., a utility company. Such arrester assemblies include a surge arrester, an isolator bracket, and a metal transformer mounting bracket. The arrestor is mounted to the isolator bracket, and the isolator bracket is mounted to the metal transformer mounting bracket, typically with a metal nut and bolt, which are conductive. The metal transformer mounting bracket is then bolted to side of the transformer tank, and packaged for shipment. To reduce packaging space, the arrester and isolator bracket are rotated around a pivot point, which is the nut and bolt connection between the isolator bracket and the metal mounting bracket, toward the transformer and then the bolt is tightened. In the field, when installing the transformer, service personnel loosen the bolt and pivot the arrester and isolator bracket to their standard position for connection to a high voltage line. The bolt is then tightened to firmly secure and position the isolator bracket relative to the metal transformer mounting bracket. It should be noted, that when the transformer is installed, the metal transformer mounting bracket is connected to the isolator bracket which is connected to the grounding end of the arrester.

Surge arresters are typically made of metal-oxide non-linear resistors (sometimes called zinc oxide discs or blocks), and have a connection for a high voltage line on one end, and a connection on the other end for grounding the arrester to the transformer ground. Typically, the ground connection side of the arrester is connected through a ground-lead disconnector that is integral to or separately attached to the isolator bracket. The purpose of the arrester is to divert damaging over-voltage transients (i.e., surges) caused by lightning or switching events safely to ground, thereby protecting the transformer from damage.

However, a leading cause of power interruptions on high voltage distribution lines is the bridging of high voltage circuits by wildlife perched by the transformer. Should an animal, e.g., a bird or squirrel, perched on the metal mounting bracket come in contact with the high voltage power distribution line on the arrester, the animal would complete the circuit between the high voltage power line and the grounded mounting bracket, likely causing an electrical flashover to occur. In response to the flashover, high current protective devices in the vicinity of the transformer, such as circuit breakers or fuses, would activate causing the transformer to disconnect from the circuit. As a result, power to customers fed from the transformer would be interrupted. Further, the heat of the electrical arc that occurs during the flashover often damages the transformer and/or the arrester. To restore power to customers, service personnel must manually reset any circuit breakers and/or replace damaged equipment.

Utilities have tried using insulating tape, insulating putty, and molded bolt caps in an attempt to insulate this perching point. None have proven effective over the long term to minimize power interruptions. U.S. Pat. No. 7,009,102 (the "'102 patent") appears to describe a cap affixed to the isolator bracket that is used to cover the bolt that connects the isolator bracket to the metal mounting bracket, which is in turn affixed to the transformer tank. The cap described in the '102 patent is affixed to a rib or fin typically found on isolator brackets to cover the metal nut. By affixing the cap to a fin on the isolator bracket, movement of the isolator bracket for packaging purposes is limited. This is so because when the cap is affixed to the isolator bracket the cap does not permit rotation of the isolator bracket and arrester relative to the metal mounting bracket secured to the transformer.

Further, when service personnel want to move the arrester when servicing the transformer, they have to remove the cap completely off the isolator bracket so that service personnel would have to find a place to store the cap or risk dropping it to the ground from their bucket truck. Further, the cap in the '102 patent only covers the bolt used to attach the isolator bracket to the metal mounting bracket, but leaves the remaining part of the metal mounting bracket accessible to wildlife contact. Thus, the small cap described in the '102 patent is not effective in preventing wildlife from completing a circuit between the high voltage line and the grounded mounting bracket.

SUMMARY

The present disclosure provides various embodiments of insulating covers for mounting brackets used to secure arrester assemblies to transformers. The purpose of the insulating cover is to protect wildlife from electric shock, and to prevent power interruptions on high voltage distribution lines caused by the bridging of high voltage circuits by wildlife. In one embodiment, an insulating cover includes a fastener cover section, a bracket cover section, and an isolator cover section between the fastener cover section and the bracket cover section. The bracket cover section can be releasably attached to a mounting bracket. Preferably, the insulating cover is made of an insulating material capable of insulating conductive components in high voltage environments ranging between 2.55 kV and 38 kV, has sufficient rigidity to withstand movement that may be caused by wildlife perched on the insulating cover, but retains sufficient flexibility to permit the insulating cover to be releasably secured to a mounting bracket. Due to the potential of a fire caused by a high voltage shock to wildlife, it is also preferred that the insulating cover is made of a flame resistant material. For example, it is preferred that the insulating cover is made from a UV stabilized low density polyethylene, or a thermoplastic vulcanizate, such as Santoprene®.

The bracket cover section of the insulating cover has a length that can range from between 0.6 inches and 4 inches, and can be 3.6 inches in length for a long mounting bracket, or between 1.2 inches and 1.3 inches for a short mounting bracket. The bracket cover section has a width that can range from between 1 inches and 3 inches, and is preferably 1.25 inches. The bracket cover section has at least two tabs used to releasably attach the bracket cover section to a transformer mounting bracket.

The present disclosure also provides embodiments of arrester assemblies that may incorporate the various embodiments of the insulating cover. In one embodiment, the arrester assembly includes an arrester, a mounting bracket for securing the arrester assembly to a transformer, an isolator bracket connected to the arrester at one end and to the mounting bracket another end, and an insulating cover releasably attached to the mounting bracket for insulating at least a portion of the mounting bracket and the connection point between the isolator bracket and the mounting bracket. The insulating covers included in the arrester assemblies may be similar to the embodiments of the insulating covers disclosed herein.

The present disclosure also provides embodiments of transformer assemblies that may incorporate the various embodiments of the insulating cover and/or arrester assemblies. In one embodiment, the transformer assembly includes a transformer, and an arrester assembly attached to the transformer. The arrester assembly includes an arrester, a mounting bracket for attaching the arrester assembly to the transformer, an isolator bracket connected to the arrester at one end and to the mounting bracket another end, and an insulating cover for insulating at least a portion of the mounting bracket and the connection point between the isolator bracket and the mounting bracket. The insulating covers and arrester assemblies included in the transformer assemblies may be similar to the embodiments of the insulating covers and arrester assemblies disclosed herein.

The present disclosure also discloses embodiments of insulating covers that cover the transformer mounting brackets. In one embodiment, the insulating cover for transformer mounting brackets includes a bracket cover surface, a first side wall extending from the bracket cover surface and a first tab extending from the first side wall, and a second side wall extending from the bracket cover surface and a second tab extending from the second side wall such that the insulating cover can be releasably attached to a transformer mounting bracket. Preferably, the insulating cover is made of an insulating material capable of insulating conductive components in high voltage environments ranging between 2.55 kV and 38 kV, has sufficient rigidity and flexibility to permit the insulating cover to be releasably secured to a mounting bracket. Due to the potential of a fire caused by a high voltage shock to wildlife, it is also preferred that the insulating cover is made of a flame resistant material. For example, it is preferred that the insulating cover is made from a UV stabilized low density polyethylene, or a thermoplastic vulcanizate, such as Santoprene®.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 1 is a perspective view of an exemplary embodiment of an insulating cover according to the present disclosure;

FIG. 4 is a perspective view of a long mounting bracket;

FIG. 5 is a side view of the long mounting bracket of FIG. 4;

FIG. 9 is a perspective view of another exemplary embodiment of an insulating cover according to the present disclosure attached to a long mounting bracket;

FIG. 10 is a side view of the insulating cover and long mounting bracket of FIG. 9;

FIG. 11 is a front view of the insulating cover and long mounting bracket of FIG. 9;

FIG. 12 is a perspective view of another exemplary embodiment of an arrester assembly according to the present disclosure;

FIG. 13 is a front view of the arrester assembly of FIG. 12;

FIG. 14 is a side view of the arrester assembly of FIG. 12;

FIG. 19 is a perspective view of another exemplary embodiment of an insulating cover according to the present disclosure;

FIG. 20 is a side view of the insulating cover of FIG. 19;

FIG. 21 is a bottom view of the insulating cover of FIG. 19;

FIG. 24 is a perspective view of another exemplary embodiment of an arrester assembly according to the present disclosure;

FIG. 25 is a side view of the arrester assembly of FIG. 24;

FIG. 26 is a front view of the arrester assembly of FIG. 24;

FIG. 30 is a perspective view of another exemplary embodiment of an arrester assembly according to the present disclosure;

DETAILED DESCRIPTION

The present disclosure provides insulating covers for mounting brackets used to secure arrester assemblies to transformers. The purpose of the insulating cover is to protect wildlife from electric shock, and to prevent power interruptions on high voltage distribution lines caused by the bridging of high voltage circuits by wildlife. The insulating covers disclosed herein preferably meet IEEE standard 1656 entitled "IEEE Guide for Testing the Electrical, Mechanical, and Durability Performance of Wildlife Protective Devices on Overhead Power Distribution Systems Rated up to 38 KV".

Generally, industry standard high distribution power system transformer tanks come in two sizes; short tanks (lower voltage ratings) and tall tanks (higher voltage ratings). There are two industry standard mounting brackets used to mount arresters to the different size transformers. One is known as a long bracket and the other is known as a short bracket. Typically, it is preferred to have the height of an energized end of the arrester in close proximity with the height of the transformer bushing, which is where the energized wire from the arrester connects to the transformer. To achieve this height proximity for taller arresters (higher voltage ratings) used on higher rated voltage (taller) transformers, short mounting brackets are preferably used. To achieve this height proximity for shorter arresters (lower voltage ratings) used on lower rated (shorter) transformers, long mounting brackets are preferably used. However, the mounting bracket used may depend upon the conditions in the field such that long mounting brackets may also be used with tall transformer tanks, and short mounting brackets may be used with short transformer tanks.

Figure 3:
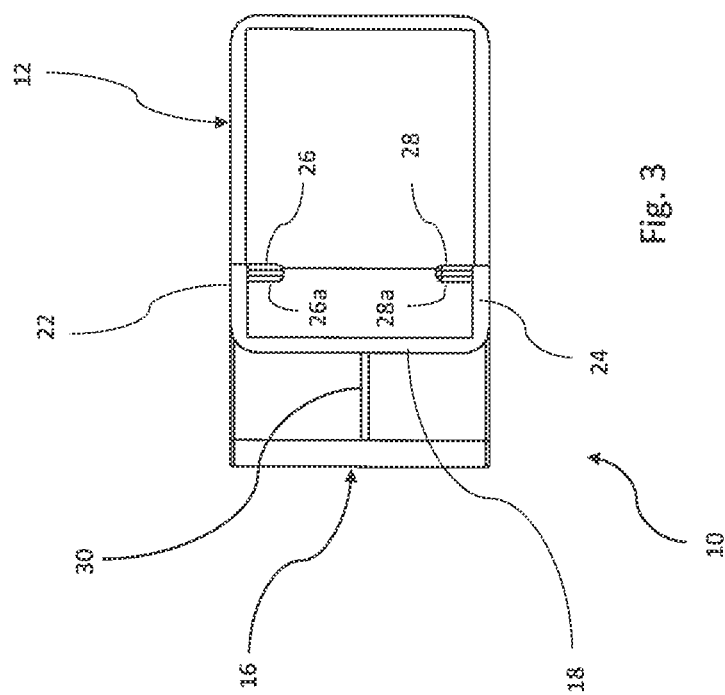
FIG. 3 is a view from the bottom of the insulating cover of FIG. 1.
Figure 2:
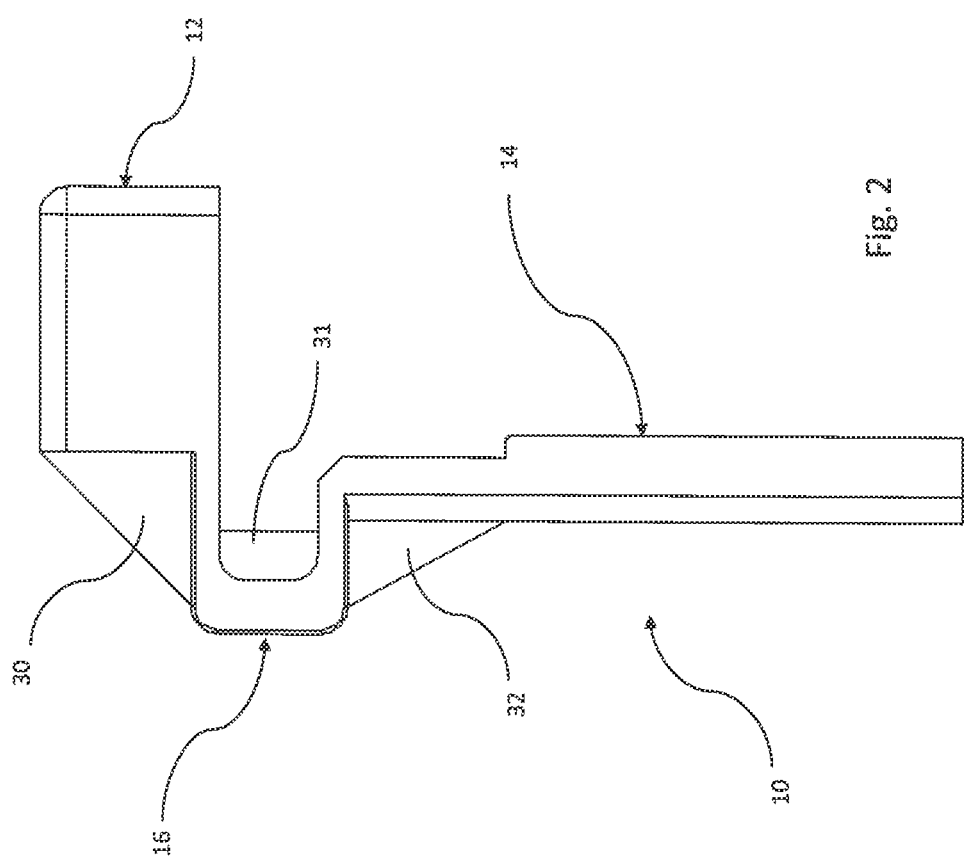
FIG. 2 is a side view of the insulating cover of FIG. 1.

Referring to FIGS. 1-3, an exemplary embodiment of an insulating cover for use with long transformer brackets is shown. The insulating cover according to this embodiment is preferably used with long mounting brackets. In this embodiment, the insulating cover 10 includes a fastener cover portion 12, a bracket cover portion 14, and an isolator cover portion 16. The fastener cover portion 12 is a rectangular box shaped cover dimensioned to cover a fastener used to connect the mounting bracket to the isolator bracket, which is typically by a nut and bolt. However, the shape of the fastener cover portion may include other shapes and dimensions, such as square box or cylindrical shapes, so long as the fastener cover portion covers the fastener used to connect the mounting bracket to the isolator bracket.

The bracket cover portion 14 in the embodiment of FIGS. 1-3 is an elongated rectangular member having a bracket insulating surface 18 of length "L1" and width "W1", and a pair of sides 24 and 22 of height "H1". Tabs 28 and 26 are secured to or moulded into the sides 24 and 22 as shown. The bracket insulating surface 18 and sides 24 and 22 are flexible such that tabs 28 and 26 can spread apart sufficient to allow the bracket cover portion 14 to fit over a mounting bracket and secure the insulating cover to the mounting bracket in an interference fit, as is described below.

The length "L1" of the bracket insulating surface 18 (and thus the bracket cover portion 14) corresponds to the length "L2" of elongated arm portion 52 of mounting bracket 50 (seen in FIGS. 4 and 5). Generally, the length "L1" of the bracket cover portion 14 can range from between about 1 inches and about 4 inches, and is preferably 3.6 inches. The width internal "W1" of the bracket insulating surface 18 (and thus the bracket cover portion 14) corresponds to the width "W2" of the mounting bracket 50 (seen in FIGS. 4 and 5). Generally, the width "W1" of the bracket cover portion 14 can range from between about 1 inch and about 3 inches, and is preferably 1.25 inches. The height "H1" of the sides 24 and 22 of the bracket cover portion 14 corresponds to the height "H2" (or thickness) of elongated arm portion 52 of mounting bracket 50 (seen in FIGS. 4 and 5). Generally, the height "H1" of the sides 24 and 22 of the bracket cover portion 14 ranges from between about 0.2 inches and about 0.4 inches, and is preferably between 0.31 inches and 0.32 inches.

Figure 6:
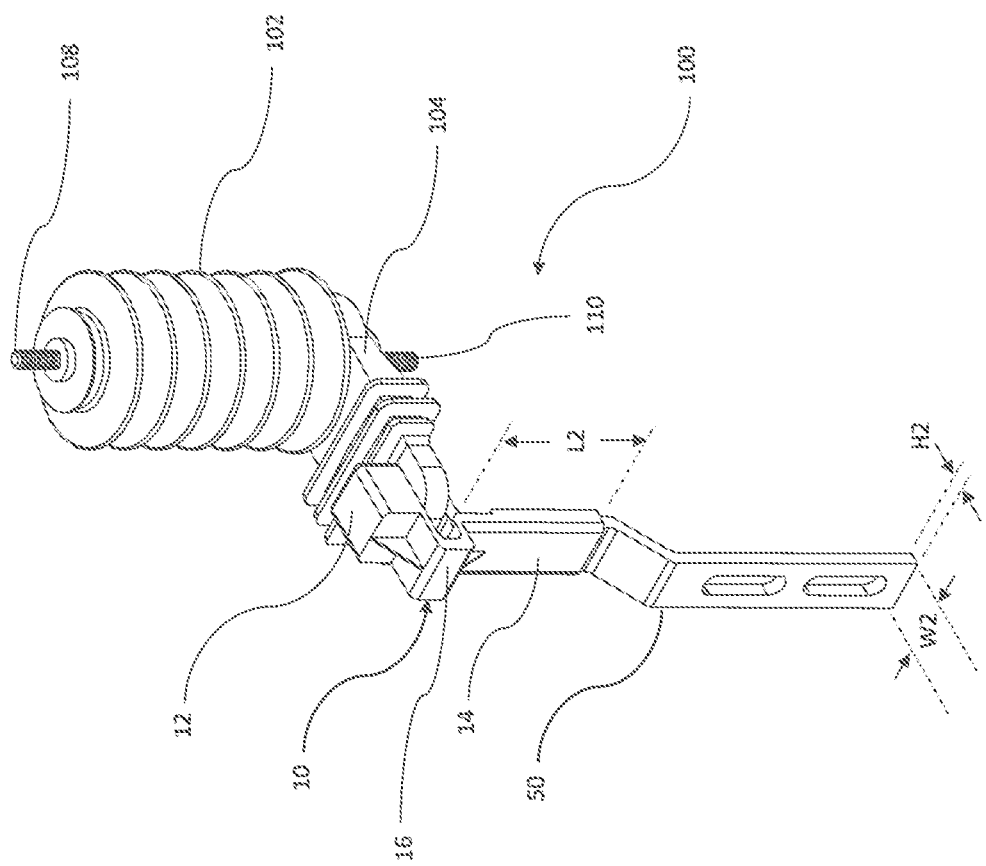
FIG. 6 is a perspective view of an embodiment of an arrester assembly according to the present disclosure.
Figure 8:
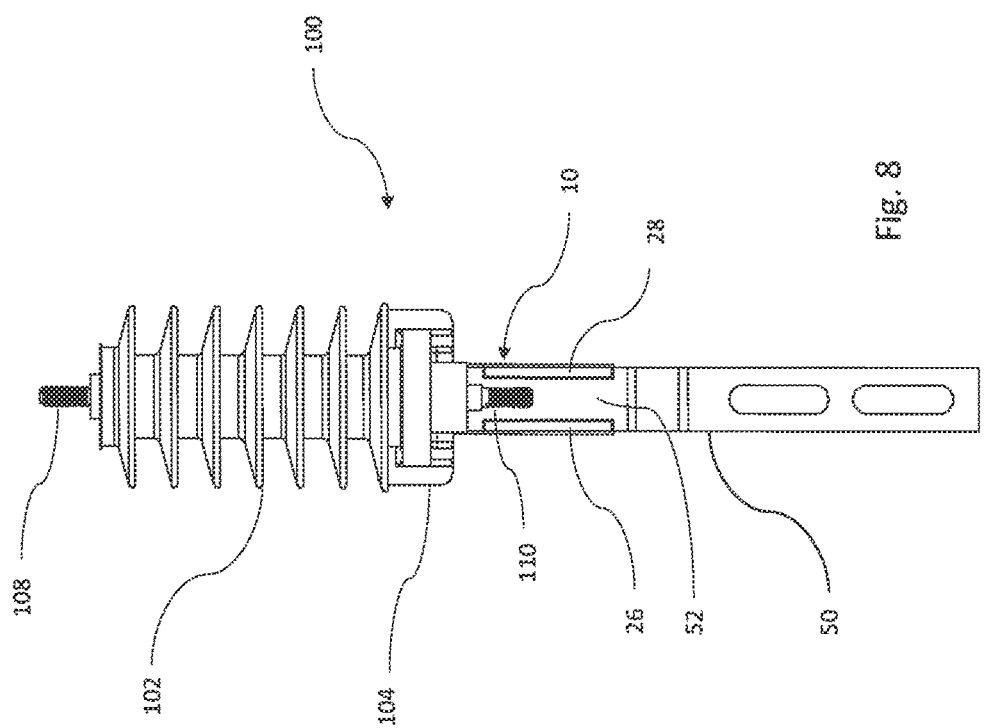
FIG. 8 is a front view of the arrester assembly of FIG. 6.
Figure 7:
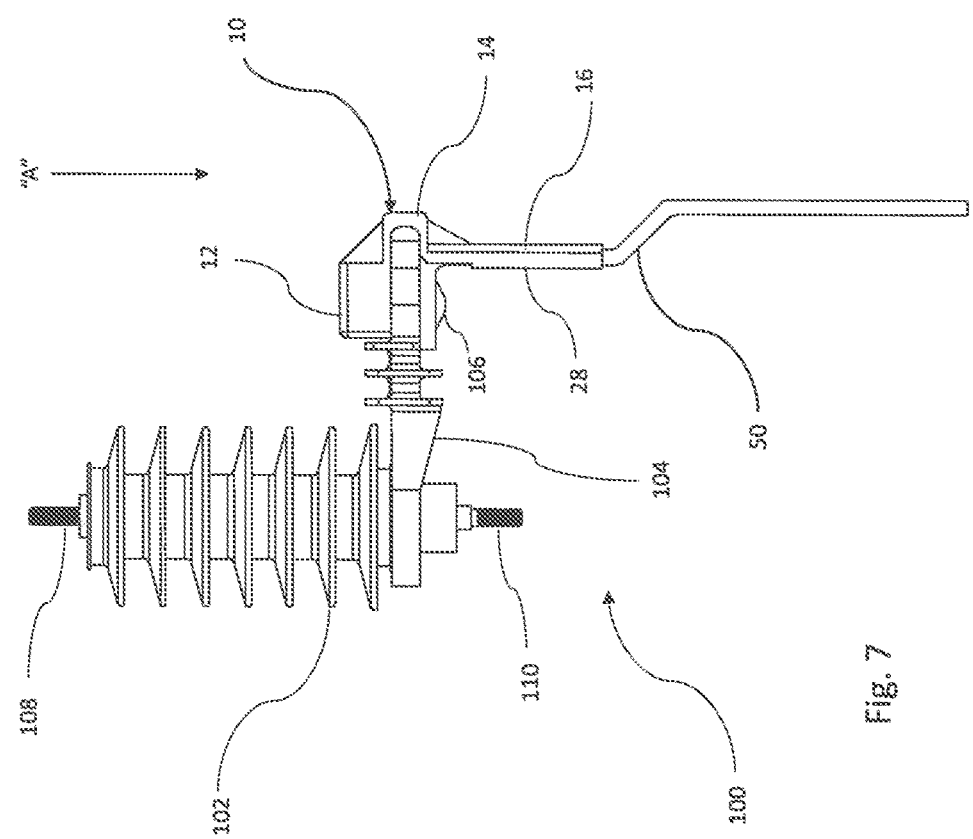
FIG. 7 is a side view of the arrester assembly of FIG. 6.

The bracket cover portion 14 according to the present disclosure is configured and dimensioned to attach directly to a mounting bracket, e.g., mounting bracket 50, with an interference fit, where an inner surface 18a (seen in FIG. 1) of the bracket cover portion 14 is adjacent to an outer surface 56 of the mounting bracket 50 (seen in FIG. 4), and where inner surfaces 22a and 24a of sides 22 and 24 of the bracket cover portion 14 are adjacent to an side surfaces 56 of the mounting bracket 50, and where inner surfaces 26a and 28a of tabs 26 and 28 of the bracket cover portion 14 are adjacent to an outer surface 58 of the mounting bracket 50. Tabs 26 and 28 of the bracket cover portion 14 can then releasably attach the bracket cover portion 14 to the mounting bracket 50, thereby attaching the insulating cover 10 to the mounting bracket 50, as seen in FIGS. 6-8.

Referring again to FIGS. 1-3, the isolator cover portion 16 of the insulating cover 10 connects the fastener cover portion 12 to the bracket cover portion 14, and is configured to go on top of and around an end portion of an isolator bracket of the arrester assembly. The isolator cover portion 16 is preferably shaped to allow the isolator bracket to pivot or rotate relative to a mounting bracket when the insulating cover 10 is installed. Cover support members 30, 31 and 32 are positioned between the fastener cover portion 12, the bracket cover portion 14 and the isolator cover portion 16, as shown, to provide stability for the insulating cover 10.

The insulating cover 10 according to the present disclosure is fabricated with an insulating material capable of insulating conductive components in high voltage environments, such as system voltages ranging between about 2.55 kV and about 38 kV. Preferably, the insulating material has a thickness of between about 0.05 inches and about 0.15 inches, and preferably about 0.09 inches to provide sufficient rigidity to withstand movement that may be caused by wildlife perched on the insulating cover 10, and is flexible to permit the insulating cover to be releasably secured to a mounting bracket, as described herein. It is also preferred to use an insulating material that has flame resistant properties that meet the UL 94 Test Method, and preferably the V-0 criteria of the UL 94 Test Method. Examples of materials that may be used to fabricate the insulating covers include, a UV stabilized low density polyethylene, or a thermoplastic vulcanizate, such as Santoprene®. However, other known electrically insulating materials may be used.

The insulating cover 10 is attached to a mounting bracket by sliding the insulating cover down along the mounting bracket 50 in the general direction of arrow "A" (seen in FIG. 7), so that the tabs 26 and 28 snap over the mounting bracket 50 and the fastener cover portion 12 of the insulating cover 10 is position over a fastener 106 securing the mounting bracket 50 to the isolator bracket 104. Using the tab configuration to secure the insulating cover 10 to a mounting bracket allows the insulating cover to be moved by service personnel up and down along the elongated arm portion 52 (seen in FIG. 4) of the mounting bracket 50 to permit the service personnel access to the fastener 106 while working on the transformer or arrester assembly.

Referring to FIGS. 6-8, an exemplary embodiment of an arrester assembly incorporating the insulating cover 10 is shown. In this exemplary embodiment, the arrester assembly 100 includes an arrester 102 connected to one end of an isolator bracket 104, a mounting bracket 50 connected to the other end of the isolator bracket 104, and an insulating cover 10 positioned over the connection point between the isolator bracket 104 and the mounting bracket 50 and along the elongated arm portion 52 of the mounting bracket 50. The mounting bracket 50 is connected to the isolator bracket 104 with a fastener 106, which is typically a nut and bolt. In this embodiment, the mounting bracket 50 is a long mounting bracket that is capable of being attached to a transformer tank.

The type and size of the arrester and isolator bracket included in an arrester assembly are dependent upon certain power conditions. For example, isolator brackets may come in different sizes, such as short, medium and long. The size of the isolator bracket provided with an arrester assembly depends upon a number of factors including the arrester breaking load, and the final desired creepage of the arrester assembly, as is known in the art. Arresters and isolator brackets contemplated for the present disclosure are standard arresters and isolator brackets used in the power distribution industry.

Referring to FIGS. 9-11, another embodiment of the insulating cover according to the present disclosure is provided. In this embodiment, the insulating cover 130 is substantially similar to the bracket cover portion 14 of the embodiment of FIGS. 1-3, with the same length "L1", width "W1" and height "H1" characteristics as those described above, and tabs 132 and 134 that provide the interference fit described above. The insulating cover 130 according to this embodiment is also fabricated with an insulating material capable of insulating conductive components in high voltage environments, such as system voltages ranging between about 2.55 kV and about 38 kV. Preferably, the insulating material has a thickness of between about 0.05 inches and about 0.15 inches, and preferably about 0.09 inches, and is flexible to permit the insulating cover to be releasably secured to a mounting bracket, as described herein. It is also preferred to use an insulating material that has flame resistant properties that meet the UL 94 Test Method, and preferably the V-0 criteria of the UL 94 Test Method. Examples of materials that may be used to fabricate the insulating covers include, a UV stabilized low density polyethylene, or a thermoplastic vulcanizate, such as Santoprene®. However, other known electrically insulating materials may be used.

Similar to the embodiment of FIGS. 1-3, the insulating cover 130 is attached to a mounting bracket by sliding the insulating cover down along the mounting bracket 50 in the general direction of arrow "A" (seen in FIG. 7), so that the tabs 132 and 134 snap over the mounting bracket 50.

Referring to FIGS. 12-14, an exemplary embodiment of an arrester assembly incorporating the insulating cover 130 is shown. In this exemplary embodiment, the arrester assembly 140 includes an arrester 102 connected to one end of an isolator bracket 104, a mounting bracket 50 connected to the other end of the isolator bracket 104, and an insulating cover 130 positioned over the mounting bracket 50 and along the elongated arm portion 52 of the mounting bracket 50. As noted above, the mounting bracket 50 is connected to the isolator bracket 104 with a fastener 106, which is typically a nut and bolt. In this embodiment, a conventional cover 144 is positioned over the nut and bolt to insulate the nut and bolt and protect wildlife that may perch on the cover 144. The insulating cover 130 and cover 144 may be sold as a kit to provide overall insulation of the mounting bracket and fastener connecting the isolator bracket 104 to the mounting bracket 50.

As described above, the type and size of the arrester and isolator bracket included in an arrester assembly 140 are dependent upon certain power conditions. For example, isolator brackets may come in different sizes, such as short, medium and long. The size of the isolator bracket provided with an arrester assembly depends upon a number of factors including the arrester breaking load, and the final desired creepage of the arrester assembly, as is known in the art. Arresters and isolator brackets contemplated for the present disclosure are standard arresters and isolator brackets used in the power distribution industry.

Figure 15:
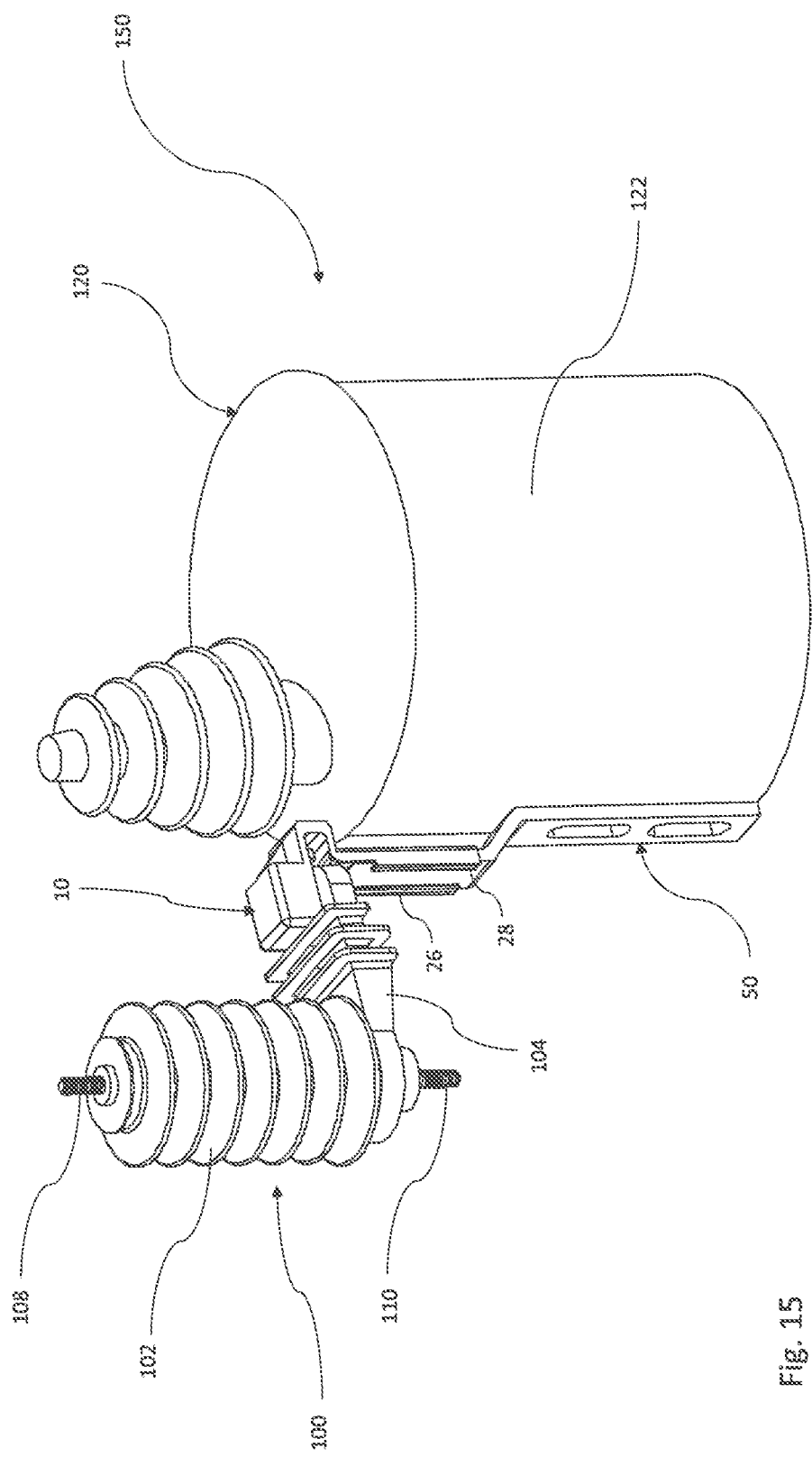
FIG. 15 is a perspective view of an exemplary embodiment of a transformer assembly according to the present application.
Figure 16:
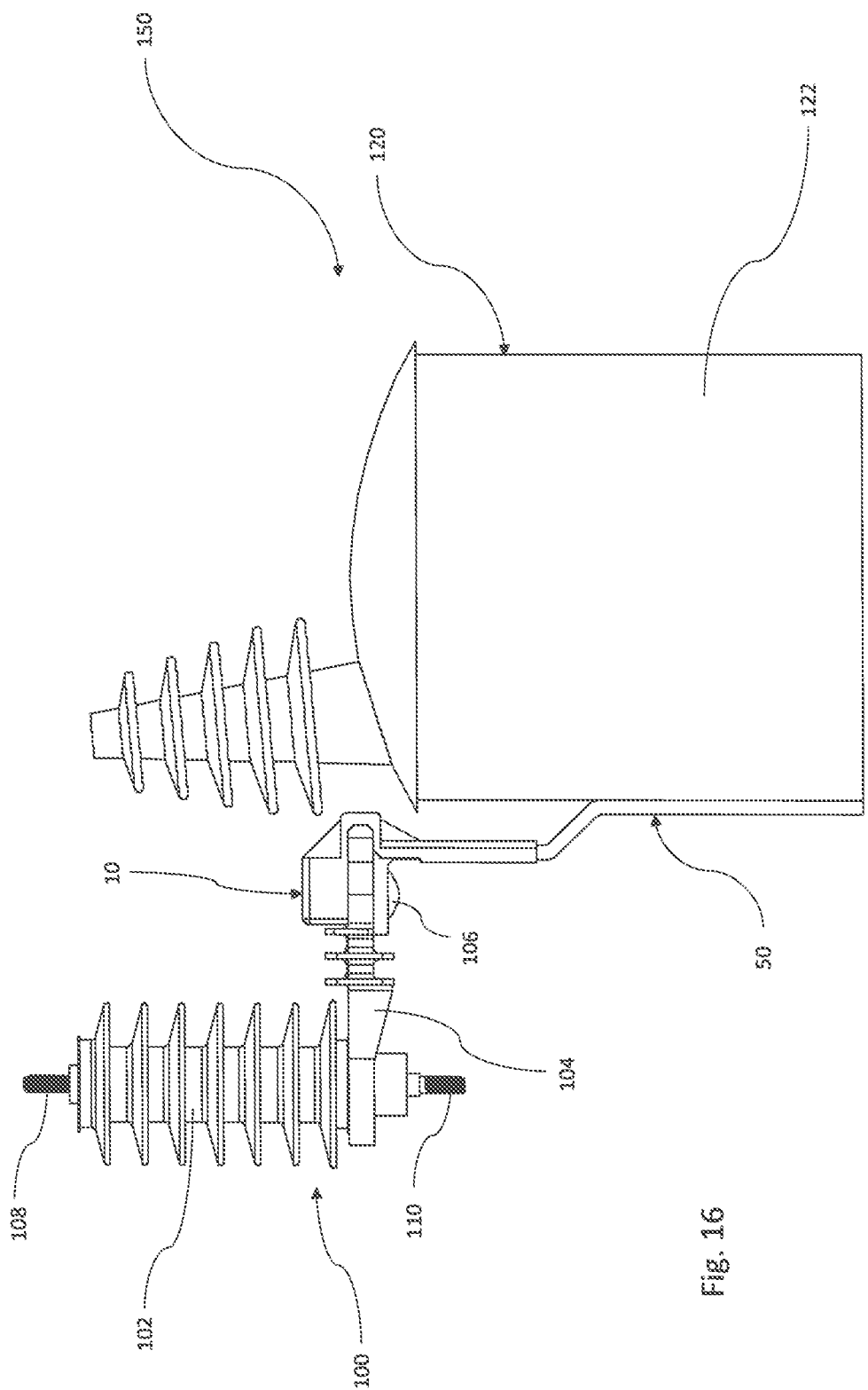
FIG. 16 is a side view of the transformer assembly of FIG. 15.
Figure 17:
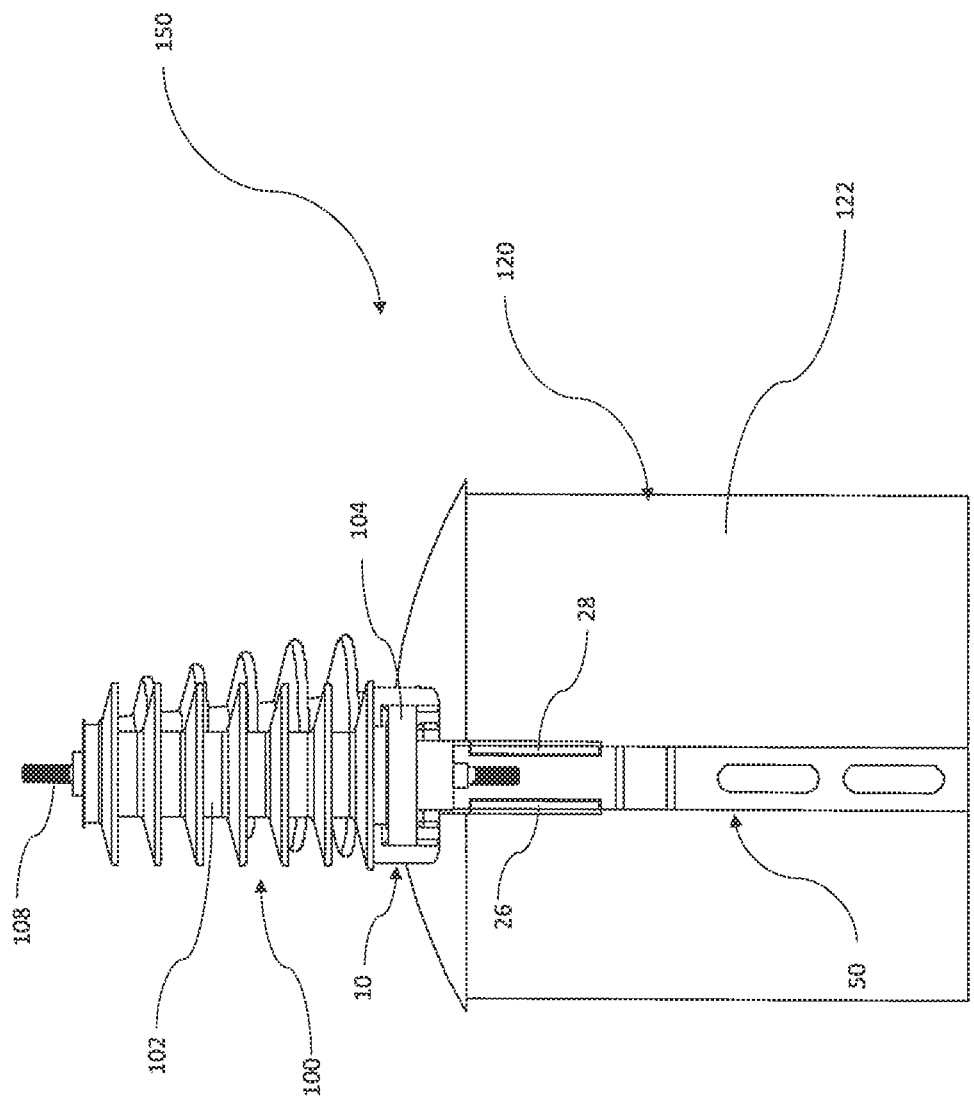
FIG. 17 is a front view of the transformer assembly of FIG. 15.
Figure 18:
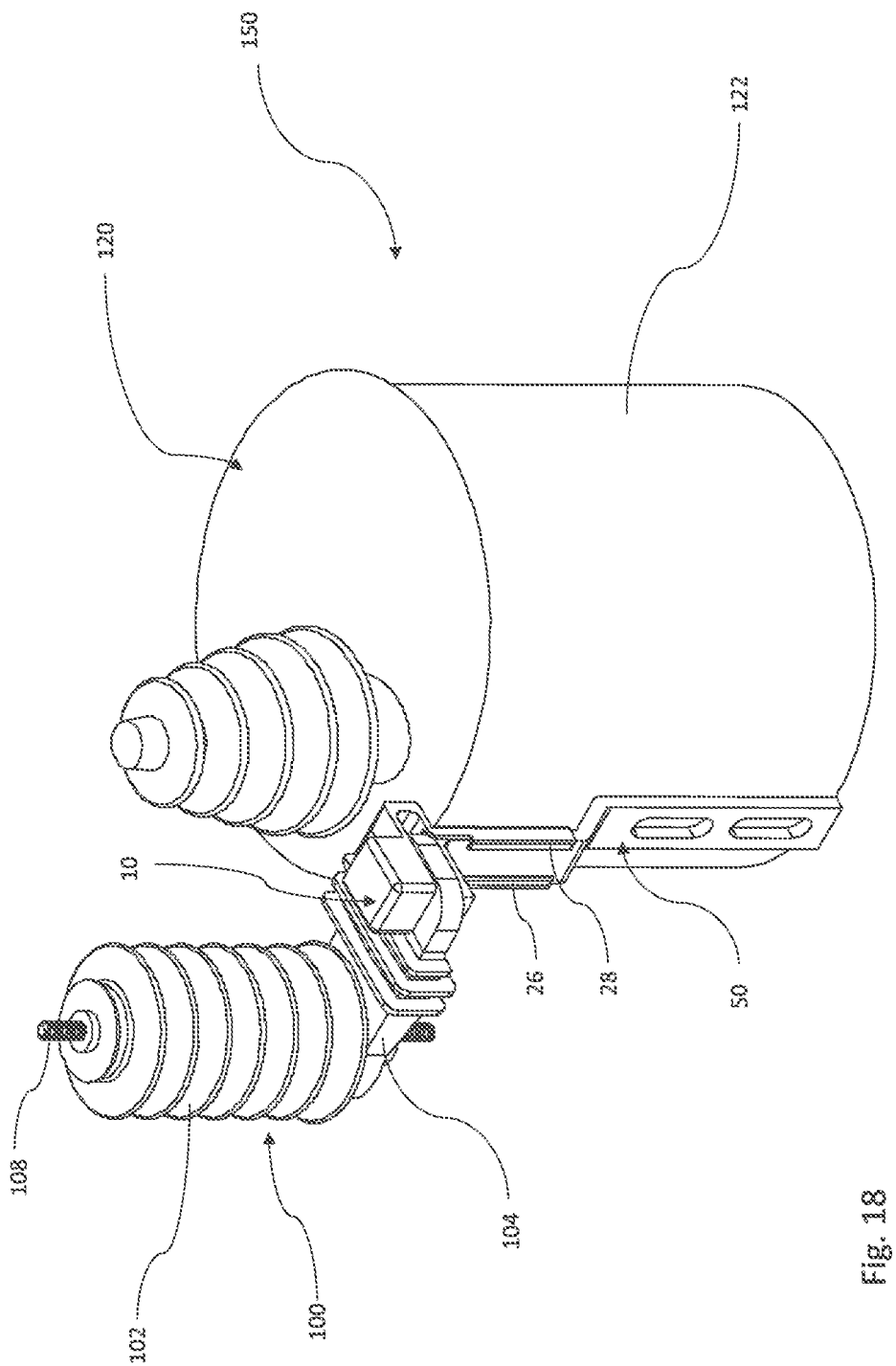
FIG. 18 is a perspective view of the transformer assembly of FIG. 15 in a packaging position.

Referring to FIGS. 15-18, an exemplary embodiment of transformer assembly 150 is shown. The transformer assembly 150 includes an arrester assembly 100 (or 140) mounted to a transformer 120, which in this embodiment is a short transformer. As shown in FIGS. 15-17, the arrester assembly 100 (or 140) is in an operational position, where the arrester 102 and isolator bracket 104 are rotated away from the transformer 120 so that a power line can be connected to the top connector 108 of the arrester 102, and a ground line can be connected to bottom connector 110 of arrester 102, and thus to the mounting bracket 50. As shown in FIG. 18, the arrester assembly 100 (or 140) is in a packaging position, where the arrester 102 and isolator bracket 104 are rotated toward the transformer 120. With the arrester assembly 100 (or 140) in the packaging position, the transformer assembly 150 can be more easily packaged for shipment to the field with minimal risk of damage to the arrester assembly.

In the exemplary embodiment of FIGS. 15-18, the arrester assembly 100 includes the arrester 102 connected to one end of the isolator bracket 104, and the mounting bracket 50 connected to the other end of the isolator bracket 104. The insulating cover 10 is positioned over the top side of connection point between the isolator bracket 104 and the mounting bracket 50, and extends along the elongated arm portion of the mounting bracket 50, as shown. More particularly, the mounting bracket 50 is secured to the isolator bracket 104 with a fastener 106, which is typically a nut and bolt, and the insulating cover 10 covers the bolt on the top side of the connection point. The mounting bracket 50 is a long mounting bracket attached to the transformer tank 122, typically with a nut that connects to a threaded anchor (not shown) mounted to the exterior of the transformer tank 122. With the insulating cover slid into its intended position, the attachment tabs 26 and 28 secure the insulating cover 10 into proper orientation with the mounting bracket 50 to ensure that the insulating cover 10 maintains the interference fit with the mounting bracket preventing a perched animal from making direct contact with the grounded mounting bracket. One skilled in the art would appreciate that the arrester assembly 140 of the embodiment of FIGS. 12-14 can be substituted for the arrester assembly 100 in the transformer assembly described above.

Referring now to FIGS. 19-21, an exemplary embodiment of an insulating cover 200 used with short mounting brackets is shown. In this embodiment, the insulating cover 200 includes a fastener cover portion 202, a bracket cover portion 204, and an isolator cover portion 206. The fastener cover portion 202 is preferably a rectangular box shaped cover dimensioned to cover a fastener used to connect a mounting bracket to an isolator bracket, which is typically by a nut and bolt. However, the shape of the fastener cover portion may include other shapes and dimensions, such as square box or cylindrical shapes, so long as the fastener cover portion covers the fastener used to connect the mounting bracket to the isolator bracket.

The bracket cover portion 204 in the embodiment of FIGS. 19-21 is a short rectangular member having a bracket insulating surface 214 of length "L3" and width "W3", and a pair of sides 216 and 218 of height "H3". Tabs 220 and 222 are secured to or moulded into the sides 216 and 218 as shown. The bracket insulating surface 214 and sides 216 and 218 are flexible such that tabs 220 and 222 can spread apart sufficient to allow the bracket cover portion 204 to fit over a mounting bracket and secure the insulating cover to the mounting bracket in an interference fit, as is described below.

Figure 23:
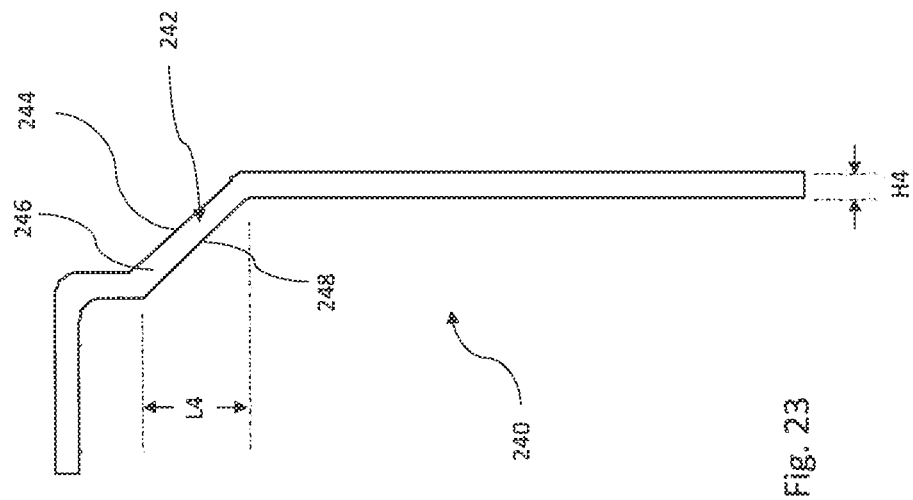
FIG. 23 is a side view of the short mounting bracket of FIG. 22.
Figure 22:
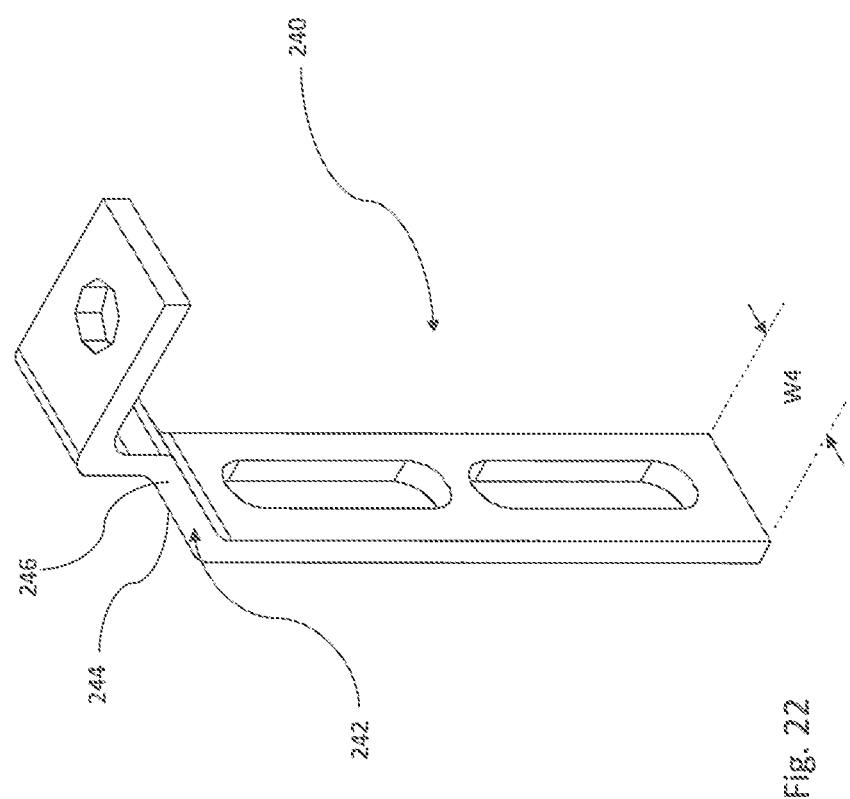
FIG. 22 is a perspective view of a short mounting bracket.

The length "L3" of the bracket insulating surface 214 (and thus the bracket cover portion 204) corresponds to the length "L4" of arm portion 242 of mounting bracket 240 (seen in FIGS. 22 and 23). Generally, the length "L3" of the bracket cover portion 204 ranges from between about 0.6 inch and about 1.5 inches, and preferably between 1.2 inches and 1.3 inches. The width internal "W3" of the bracket insulating surface 214 (and thus the bracket cover portion 204) corresponds to the width "W4" of the mounting bracket 240 (seen in FIG. 22). Generally, the width internal "W3" of the bracket cover portion 204 can range from between about 1 inch and about 3 inches, and is preferably 1.25 inches. The height "H3" of the sides 216 and 218 of the bracket cover portion 204 corresponds to the height "H4" (or thickness) of arm portion 242 of mounting bracket 240 (seen in FIGS. 22 and 23). Generally, the height "H3" of the sides 216 and 218 of the bracket cover portion 204 ranges from between about 0.1 inches and about 0.5 inches, and is preferably 0.24 inches.

The bracket cover portion 204 according to the present disclosure is configured and dimensioned to attach directly to a mounting bracket, e.g., mounting bracket 240, with an interference fit, where an inner surface 214*a* (seen in FIG. 19) of the bracket cover portion 204 is adjacent to an outer surface 244 of the mounting bracket 240 (seen in FIGS. 22 and 23), and where inner surfaces 216*a* and 218*a* of sides 216 and 218 of the bracket cover portion 204 are adjacent to an side surfaces 246 of the mounting bracket 240, and where inner surfaces 220*a* and 222*a* of tabs 220 and 222 of the bracket cover portion 204 are adjacent to an outer surface 248 of the mounting bracket 240. Tabs 220 and 222 of the bracket cover portion 204 can then releasably attach the bracket cover portion 204 to the mounting bracket 240, thereby attaching the insulating cover 200 to the mounting bracket 240, as seen in FIGS. 18-20.

Referring again to FIGS. 19-21, the isolator cover portion 206 of the insulating cover 200 connects the fastener cover portion 202 to the bracket cover portion 204, and is configured to go on top of and around an end portion of an isolator bracket of the arrester assembly. The isolator cover portion 206 is preferably a C-shaped member that allows the isolator bracket to pivot or rotate relative to a mounting bracket when the insulating cover 200 is installed.

The insulating cover 200 according to this embodiment of the present disclosure is fabricated with an insulating material capable of insulating conductive components in high voltage environments, such as system voltages ranging between about 2.55 kV and about 38 kV. Preferably, the insulating material has a thickness of between about 0.05 inches and about 0.15 inches, and preferably about 0.09 inches to provide sufficient rigidity to withstand movement that may be caused by wildlife perched on the insulating cover 200, and is flexible to permit the insulating cover to be releasably secured to a mounting bracket, as described herein. It is also preferred to use an insulating material that has flame resistant properties that meet the UL 94 Test Method, and preferably the V-0 criteria of the UL 94 Test Method. Examples of materials that may be used to fabricate the insulating covers include, a UV stabilized low density polyethylene, or a thermoplastic vulcanizate, such as Santoprene®. However, other known electrically insulating materials may be used.

The insulating cover 200 is attached to a mounting bracket 240 by sliding the insulating cover down along the mounting bracket in the general direction of arrow "B" (seen in FIG. 25), so that the tabs 220 and 222 snap over the mounting bracket 240, and the fastener cover portion 202 of the insulating cover 200 is position over a fastener 106 securing the mounting bracket 240 to the isolator bracket 104. Using the tab configuration to secure the insulating cover 200 to a mounting bracket allows easy removal of the insulating cover 200 from the mounting bracket to permit service personnel access to the fastener 106 while working on the transformer or arrester assembly.

Referring to FIGS. 24-26, an exemplary embodiment of an arrester assembly incorporating the insulating cover 200 is shown. In this exemplary embodiment, the arrester assembly 250 includes an arrester 102 connected to one end of an isolator bracket 104, a mounting bracket 240 connected to the other end of the isolator bracket 104, and an insulating cover 200 positioned over the connection point between the isolator bracket 104 and the mounting bracket 240 and along the arm portion 242 of the mounting bracket. The mounting bracket 240 is connected to the isolator bracket 104 with a fastener 106, which is typically a nut and bolt. In this embodiment, the mounting bracket 240 is a short mounting bracket that is capable of being attached to a transformer tank.

As described above, the type and size of the arrester 102 and isolator bracket 104 included in the arrester assembly 250 are dependent upon certain power conditions. For example, isolator brackets may come in different sizes, such as short, medium and long. The size of the isolator bracket provided with an arrester assembly depends upon a number of factors including the arrester breaking load, and the final desired creepage of the arrester assembly, as is known in the art. Arresters and isolator brackets contemplated for the present disclosure are standard arresters and isolator brackets used in the power distribution industry.

Figure 29:
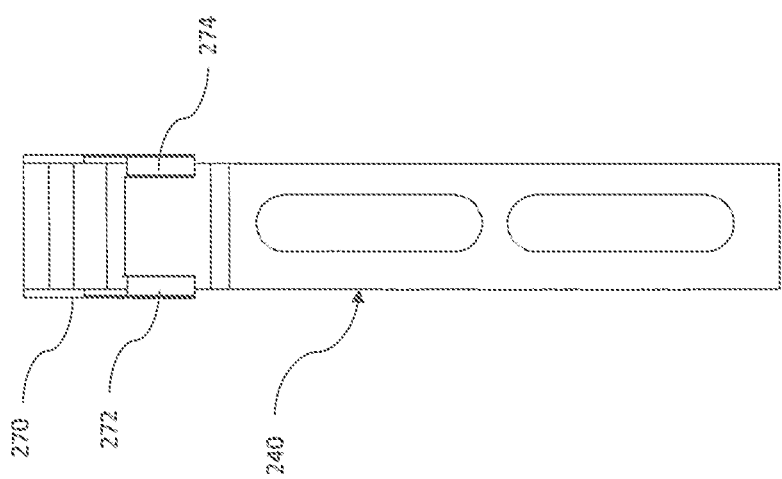
FIG. 29 is a front view of the insulating cover and short mounting bracket of FIG. 27.
Figure 28:
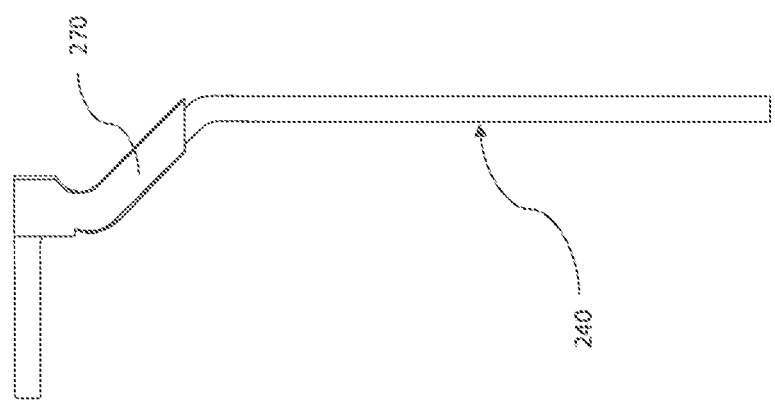
FIG. 28 is a side view of the insulating cover and short mounting bracket of FIG. 27.
Figure 27:
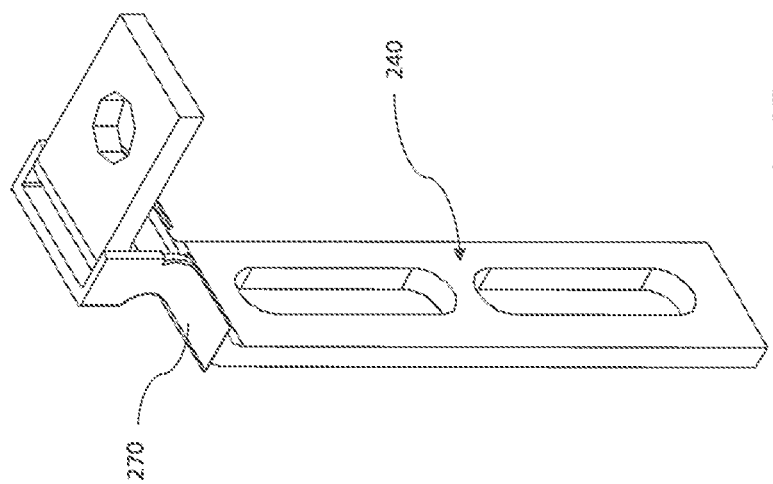
FIG. 27 is a perspective view of another exemplary embodiment of an insulating cover according to the present disclosure attached to a short mounting bracket.

Referring to FIGS. 27-29, another embodiment of the insulating cover according to the present disclosure is provided. In this embodiment, the insulating cover 270 is substantially similar to the bracket cover portion 204 of the embodiment of FIGS. 19-21, with the same length "L3", width "W3" and height "H3" characteristics as those described above, and tabs 272 and 274 that provide the interference fit described above. The insulating cover 270 according to this embodiment is also fabricated with an insulating material capable of insulating conductive components in high voltage environments, such as system voltages ranging between about 2.55 kV and about 38 kV. Preferably, the insulating material has a thickness of between about 0.05 inches and about 0.15 inches, and preferably about 0.09 inches, and is flexible to permit the insulating cover to be releasably secured to a mounting bracket, as described herein. It is also preferred to use an insulating material that has flame resistant properties that meet the UL 94 Test Method, and preferably the V-0 criteria of the UL 94 Test Method. Examples of materials that may be used to fabricate the insulating covers include, a UV stabilized low density polyethylene, or a thermoplastic vulcanizate, such as Santoprene®. However, other known electrically insulating materials may be used.

Similar to the embodiment of FIGS. 19-21, the insulating cover 270 is attached to a mounting bracket 240 by sliding the insulating cover down along the mounting bracket 240 in the general direction of arrow "B" (seen in FIG. 25), so that the tabs 272 and 274 snap over the mounting bracket 240.

Figure 32:
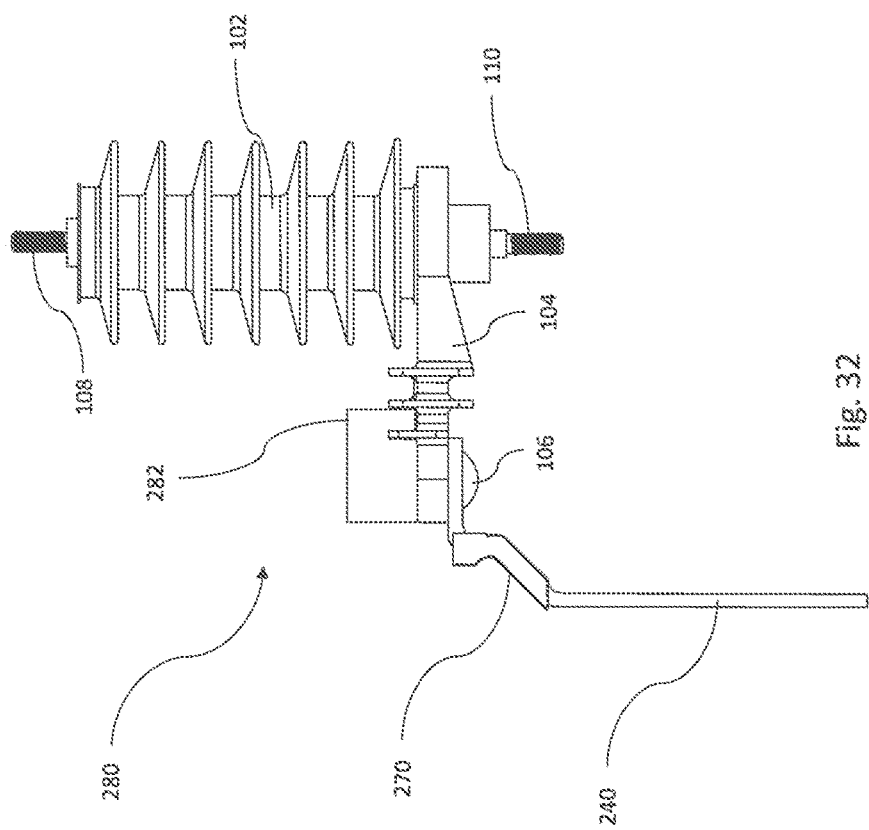
FIG. 32 is a side view of the arrester assembly of FIG. 30.
Figure 31:
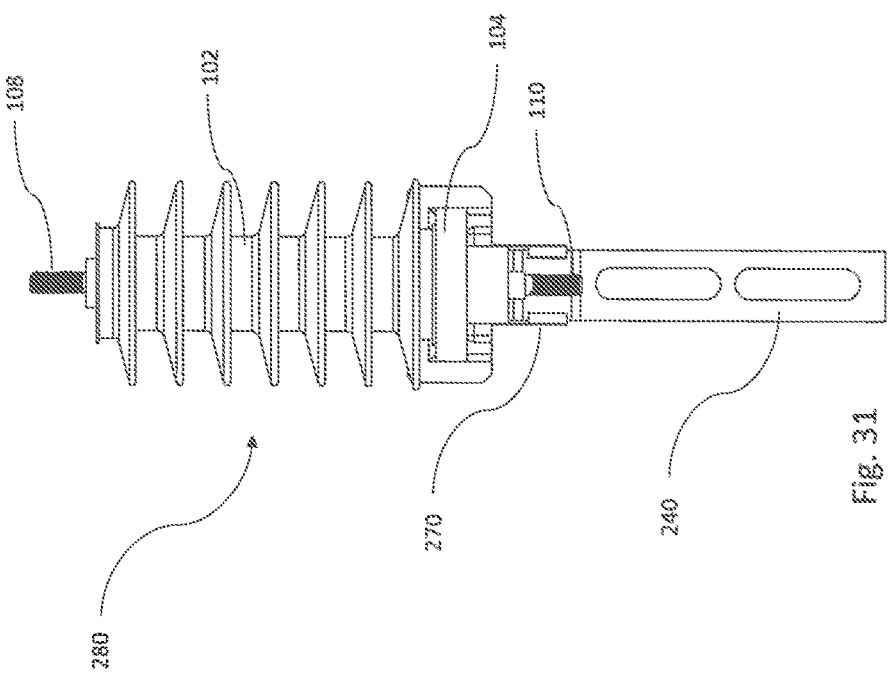
FIG. 31 is a front view of the arrester assembly of FIG. 30.

Referring to FIGS. 30-32, an exemplary embodiment of an arrester assembly incorporating the insulating cover 270 is shown. In this exemplary embodiment, the arrester assembly 280 includes an arrester 102 connected to one end of an isolator bracket 104, a mounting bracket 240 connected to the other end of the isolator bracket 104, and an insulating cover 270 positioned over the mounting bracket 240 and along the arm portion 242 of the mounting bracket 240. As noted above, the mounting bracket 240 is connected to the isolator bracket 104 with a fastener 106, which is typically a nut and bolt. In this embodiment, a conventional cover 282 is positioned over the nut and bolt to insulate the nut and bolt and protect wildlife that may perch on the cover 282. The insulating cover 270 and cover 282 may be sold as a kit to provide overall insulation of the mounting bracket and fastener connecting the isolator bracket 104 to the mounting bracket 240.

As described above, the type and size of the arrester and isolator bracket included in an arrester assembly 280 are dependent upon certain power conditions. For example, isolator brackets may come in different sizes, such as short, medium and long. The size of the isolator bracket provided with an arrester assembly depends upon a number of factors including the arrester breaking load, and the final desired creepage of the arrester assembly, as is known in the art. Arresters and isolator brackets contemplated for the present disclosure are standard arresters and isolator brackets used in the power distribution industry.

Figure 33:
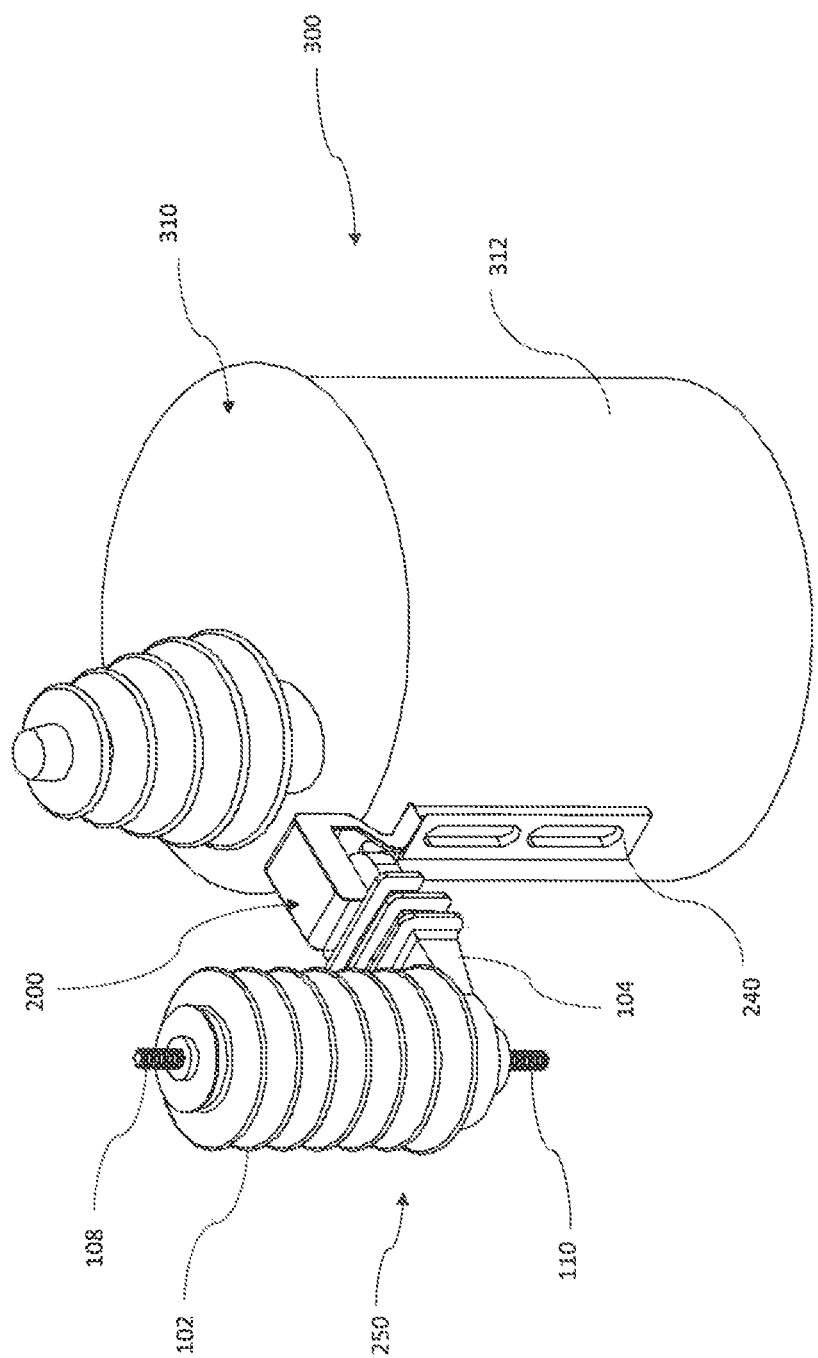
FIG. 33 is a perspective view of another exemplary embodiment of a transformer assembly according to the present disclosure.
Figure 34:
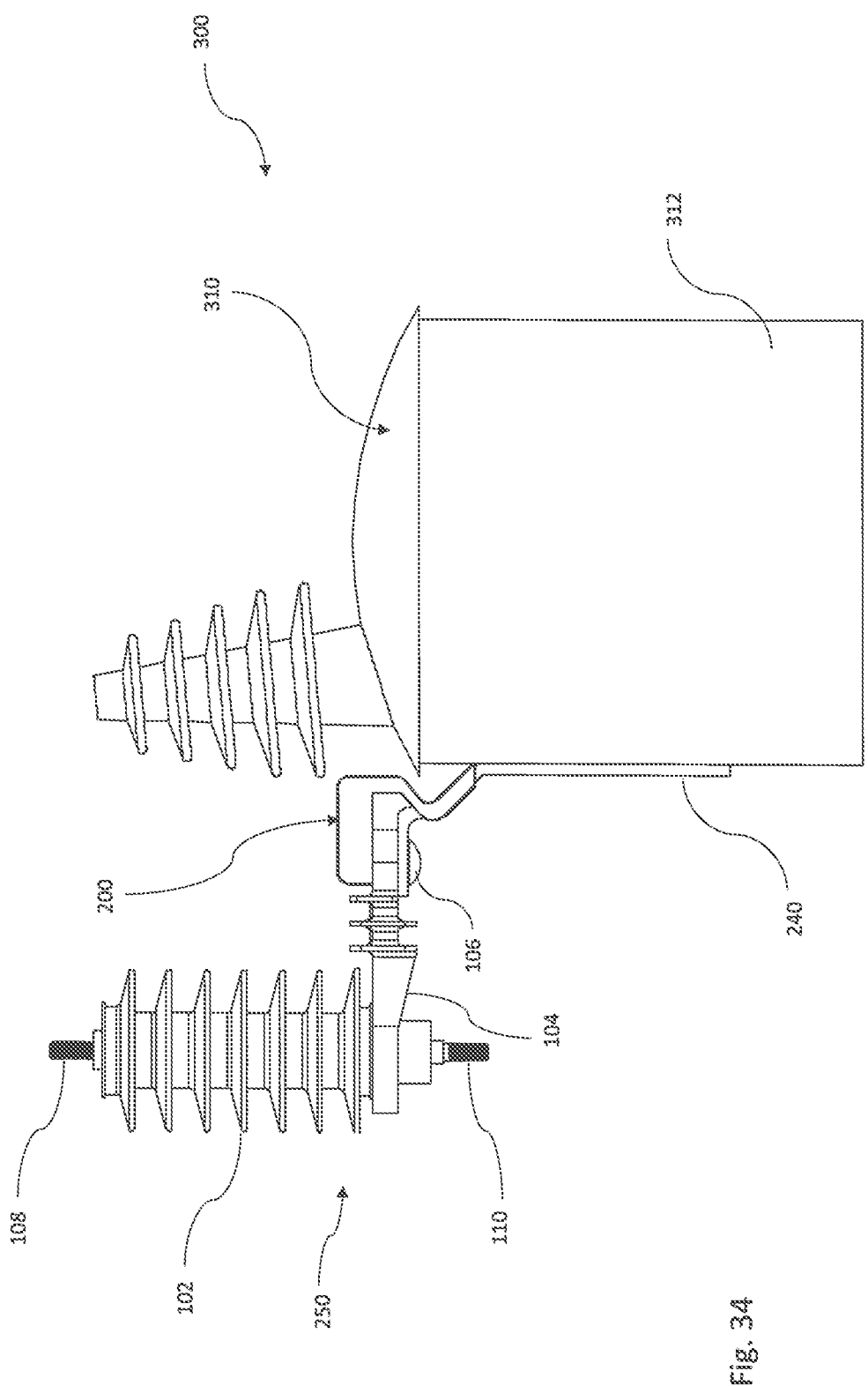
FIG. 34 is a side view of the transformer assembly of FIG. 33.
Figure 35:
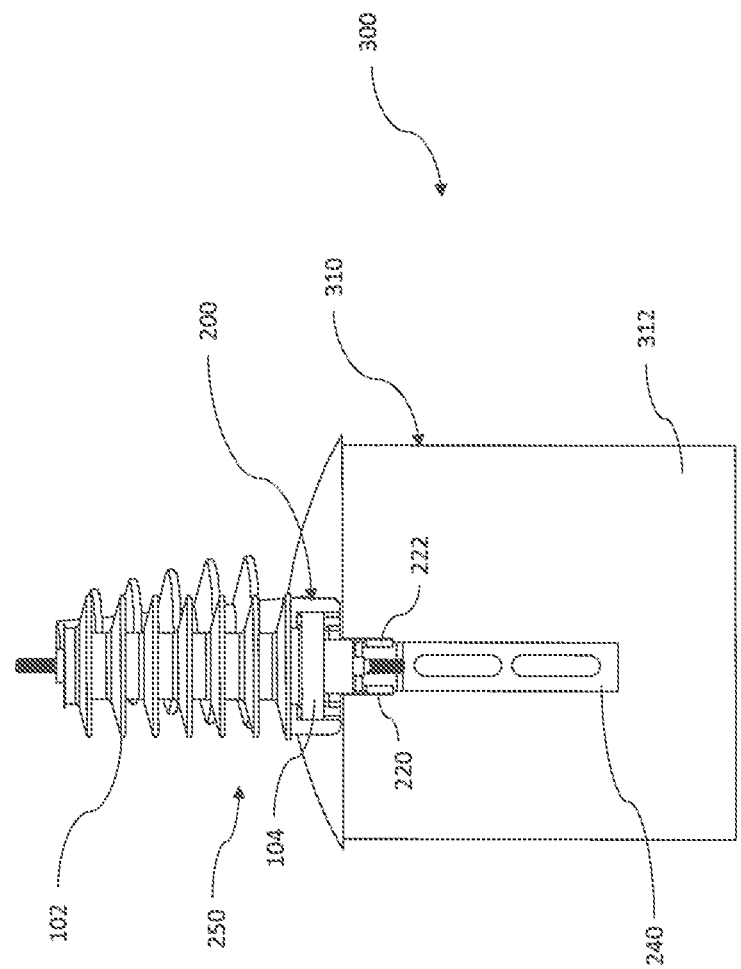
FIG. 35 is a front view of the transformer assembly of FIG. 33.
Figure 36:
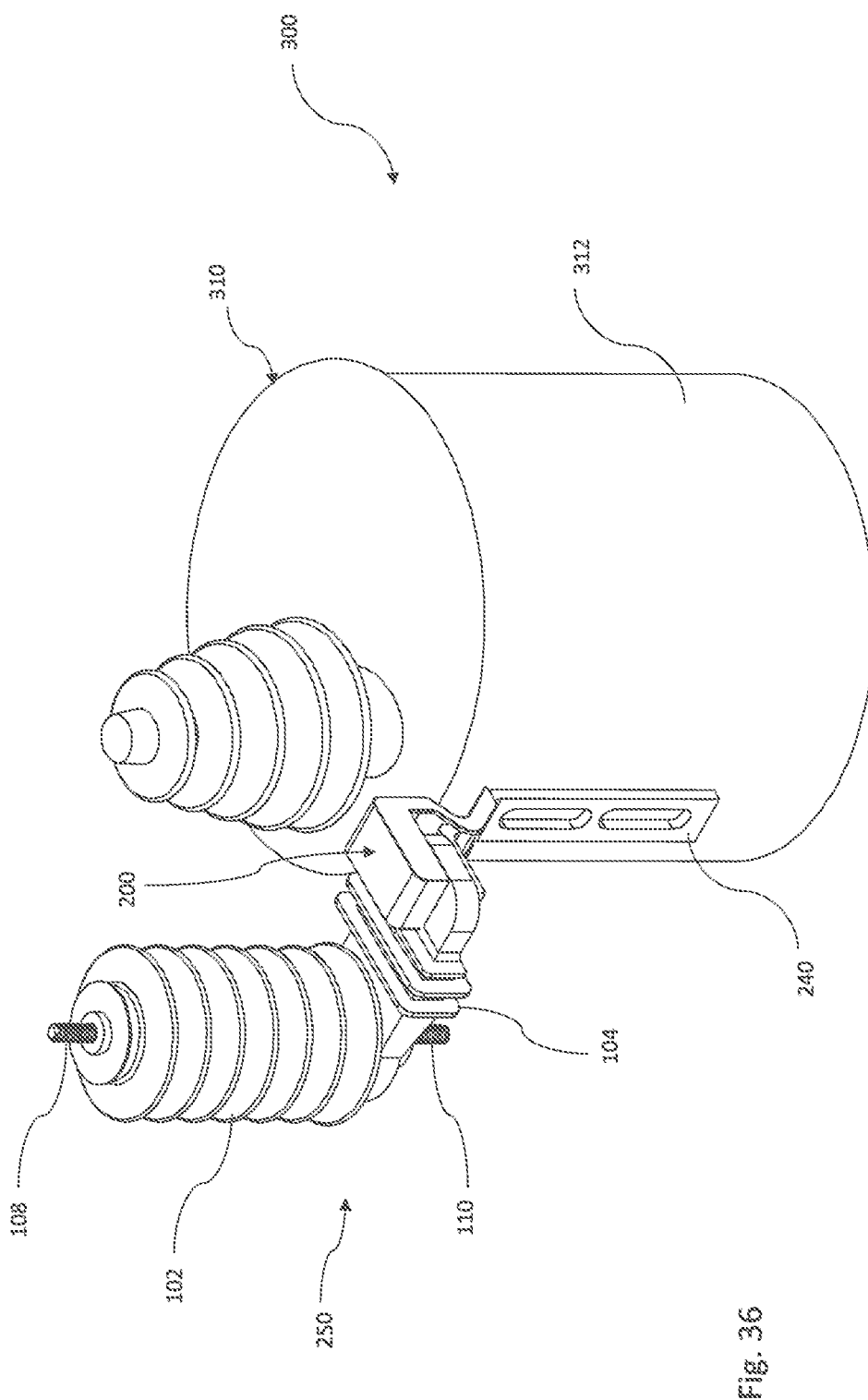
FIG. 36 is a perspective view of the transformer assembly of FIG. 33 in a packaging position.

Referring to FIGS. 33-36, an exemplary embodiment of transformer assembly 300 is shown. The transformer assembly 300 includes an arrester assembly 250 (or 280) mounted to a transformer 310, which in this embodiment is a tall transformer. As shown in FIGS. 33-35, the arrester assembly 250 (or 280) is in an operational position rotated away from the transformer 310 so that a power line can be connected to top connector 108 of the arrester 102 and a ground line can be connected to bottom connector 110 of the arrester 102. As shown in FIG. 36 the arrester assembly 250 (or 280) is in a packaging position, where the arrester 102 and isolator bracket 104 are rotated toward the transformer 310. With the arrester assembly 250 (or 280) in the packaging position, the transformer assembly 300 can be more easily packaged for shipment to the field with minimal risk of damage to the arrester assembly.

In the exemplary embodiment of FIGS. 33-36, the arrester assembly 250 includes the arrester 102 connected to one end of the isolator bracket 104 and the mounting bracket 240 connected to the other end of the isolator bracket 104. The insulating cover 200 is positioned over the top side of connection point between the isolator bracket 104 and the mounting bracket 240, and covers the arm portion 242 of the mounting bracket, as shown. More particularly, the mounting bracket 240 is secured to the isolator bracket 104 with a fastener 106, which is typically a nut and bolt, and the insulating cover 200 covers the bolt on the top side of the connection point. The mounting bracket 240 is a short mounting bracket attached to the transformer tank 312, typically with a nut that connects to a threaded anchor (not shown) mounted to the exterior of the transformer tank 312. With the insulating cover slid into its intended position, the attachment tabs 220 and 222 secure the insulating cover 200 into proper orientation with the mounting bracket 240 to ensure that the insulating cover 200 maintains the interference fit with the mounting bracket preventing a perched animal from making direct contact with the grounded mounting bracket. One skilled in the art would appreciate that the arrester assembly 280 of the embodiment of FIGS. 30-32 can be substituted for the arrester assembly 250 in the transformer assembly described above.

As noted, embodiments of the insulating covers of the present disclosure are designed such that after the cover is attached to a mounting bracket the isolator bracket can pivot or rotate relative to the mounting bracket in either direction from an operational position to a packaging position. This capability to pivot or rotate the arrester assembly with the insulating cover positioned on the mounting bracket allows the transformer assembly to be shipped as a one piece unit ready for installation in the field, taking up minimum packaging space, and minimizing possible shipping damage. Once at the construction site or in the field, the arrester assembly can be rotated or pivoted to the operational position for connection to power and ground lines. It will be understood that various modifications can be made to the embodiments of the present disclosure herein without departing from the spirit and scope thereof. Therefore, the above description should not be construed as limiting the disclosure, but merely as embodiments thereof. Those skilled in the art will envision other modifications within the scope and spirit of the invention as defined by the claims appended hereto.

What is claimed is:

1. An arrestor assembly having an insulating cover for mounting brackets, comprising; a fastener cover section, a bracket cover section, and an isolator cover section between the fastener cover section and the bracket cover section, wherein the bracket cover section includes at least two tabs adapted to releasably attach the bracket cover section with an interference fit between the at least two tabs and a mounting bracket.

2. The insulating cover according to claim 1, wherein the insulating cover is made of an insulating material capable of insulating conductive components in high voltage environments ranging between 2.55 kV and 38 kV.

3. The insulating cover according to claim 1, wherein the insulating cover is made of an insulating material having sufficient rigidity to withstand movement that may be caused by wildlife perched on the insulating cover, and being flexible to permit the insulating cover to be releasably secured to a mounting bracket.

4. The insulating cover according to claim 1, wherein the insulating cover is made of a flame resistant material.

5. The insulating cover according to claim 1, wherein the insulating cover is made of a UV stabilized low density polyethylene.

6. The insulating cover according to claim 1, wherein the insulating cover is made of a thermoplastic vulcanizate.

7. The insulating cover according to claim 6, wherein the thermoplastic vulcanizate comprises Santoprene®.

8. The insulating cover according to claim 1, wherein the bracket cover section has a length that can range from between 0.6 inch and 4 inches.

9. The insulating cover according to claim 1, wherein the bracket cover section has a length of 3.6 inches.

10. The insulating cover according to claim 1, wherein the bracket cover section has a length between 1.2 inches and 1.3 inches.

11. The insulating cover according to claim 1, wherein the bracket cover section has a width that can range from between 1 inch and 3 inches.

12. The insulating cover according to claim 1, wherein the bracket cover section has a width of 1.25 inches.

13. An arrester assembly, comprising:
an arrester;
a mounting bracket for securing the arrester assembly to a transformer;
an isolator bracket connected to the arrester at one end and to the mounting bracket another end; and
an insulating cover releasably attached to the mounting bracket for insulating at least a portion of the mounting bracket and the connection point between the isolator bracket and the mounting bracket, wherein the insulating cover includes at least two tabs adapted to releasably attach the insulating cover with an interference fit between the at least two tabs and the mounting bracket.

14. The arrester assembly according to claim 13, wherein the insulating cover comprises; a fastener cover section, a bracket cover section, and an isolator cover section between the fastener cover section and the bracket cover section, wherein the bracket cover section can be releasably attached to the mounting bracket.

15. The arrester assembly according to claim 14, wherein the bracket cover section has a length that can range from between 0.6 inch and 4 inches.

16. The arrester assembly according to claim 14, wherein the bracket cover section has a length of 3.6 inches.

17. The arrester assembly according to claim 14, wherein the bracket cover section has a length between 1.2 inches and 1.3 inches.

18. The arrester assembly according to claim 14, wherein the bracket cover section has a width that can range from between 1 inch and 3 inches.

19. The arrester assembly according to claim 14, wherein the bracket cover section has a width of 1.25 inches.

20. The arrester assembly according to claim 13, wherein the insulating cover is made of an insulating material capable of insulating conductive components in high voltage environments ranging between 2.55 kV and 38 kV.

21. The arrester assembly according to claim 13, wherein the insulating cover is made of an insulating material having sufficient rigidity to withstand movement that may be caused by wildlife perched on the insulating cover, and being flexible to permit the insulating cover to be releasably attached to the mounting bracket.

22. The arrester assembly according to claim 13, wherein the insulating cover is made of a flame resistant material.

23. The arrester assembly according to claim 13, wherein the insulating cover is made of a UV stabilized low density polyethylene.

24. The arrester assembly according to claim 13, wherein the insulating cover is made of a thermoplastic vulcanizate.

25. The arrester assembly according to claim 24, wherein the thermoplastic vulcanizate comprises Santoprene®.

26. A transformer assembly, comprising:
a transformer; and
an arrester assembly attached to the transformer, the arrester assembly having an arrester, a mounting bracket for attaching the arrester assembly to the transformer, an isolator bracket connected to the arrester at one end and to the mounting bracket another end, and an insulating cover for insulating at least a portion of the mounting bracket and the connection point between the isolator bracket and the mounting bracket, wherein the insulating cover includes at least two tabs adapted to releasably attach the insulating cover with an interference fit between the at least two tabs and the mounting bracket.

27. The transformer assembly according to claim 26, wherein the insulating cover comprises; a fastener cover section, a bracket cover section, and an isolator cover section between the fastener cover section and the bracket cover section, wherein the bracket cover section can be releasably attached to the mounting bracket.

28. The transformer assembly according to claim 27, wherein the bracket cover section has a length that can range from between 0.6 inch and 4 inches.

29. The transformer assembly according to claim 27, wherein the bracket cover section has a length of 3.6 inches.

30. The transformer assembly according to claim 27, wherein the bracket cover section has a length between 1.2 inches and 1.3 inches.

31. The transformer assembly according to claim 27, wherein the bracket cover section has a width that can range from between 1 inch and 3 inches.

32. The transformer assembly according to claim 27, wherein the bracket cover section has a width of 1.25 inches.

33. The transformer assembly according to claim 26, wherein the insulating cover is made of an insulating material capable of insulating conductive components in high voltage environments ranging between 2.55 kV and 38 kV.

34. The transformer assembly according to claim 26, wherein the insulating cover is made of an insulating material having sufficient rigidity to withstand movement that may be caused by wildlife perched on the insulating cover, and being flexible to permit the insulating cover to be releasably attached to the mounting bracket.

35. The transformer assembly according to claim 26, wherein the insulating cover is made of a flame resistant material.

36. The transformer assembly according to claim 26, wherein the insulating cover is made of a UV stabilized low density polyethylene.

37. The transformer assembly according to claim 26, wherein the insulating cover is made of a thermoplastic vulcanizate.

38. The transformer assembly according to claim 37, wherein the thermoplastic vulcanizate comprises Santoprene®.

39. An arrestor assembly having an insulating cover for transformer mounting brackets, comprising a bracket cover surface, a first side wall extending from the bracket cover surface and a first tab extending from the first side wall, and a second side wall extending from the bracket cover surface and a second tab extending from the second side wall, wherein the first tab and second tab are adapted to releasably attach the insulating cover with an interference fit between the at least two tabs and a transformer mounting bracket, wherein the insulating cover is made of an insulating material capable of insulating conductive components in high voltage environments ranging between 2.55 kV and 38 kV.

40. The insulating cover according to claim 39, wherein the bracket cover surface has a length that can range from between 0.6 inch and 4 inches.

41. The insulating cover according to claim 39, wherein the bracket cover surface has a length of 3.6 inches.

42. The insulating cover according to claim 39, wherein the bracket cover surface has a length between 1.2 inches and 1.3 inches.

43. The insulating cover according to claim 39, wherein the insulating cover is made of a flame resistant material.

44. The insulating cover according to claim 39, wherein the insulating cover is made of a UV stabilized low density polyethylene.

45. The insulating cover according to claim 39, wherein the insulating cover is made of a thermoplastic vulcanizate.

* * * * *